US011005297B2

United States Patent
Shichino

(10) Patent No.: US 11,005,297 B2
(45) Date of Patent: May 11, 2021

(54) POWER RECEIVING APPARATUS, POWER TRANSMISSION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 16/371,360

(22) Filed: Apr. 1, 2019

(65) Prior Publication Data
US 2019/0312462 A1 Oct. 10, 2019

(30) Foreign Application Priority Data
Apr. 6, 2018 (JP) .............................. JP2018-074045

(51) Int. Cl.
| | | |
|---|---|---|
| *H02J 7/02* | (2016.01) | |
| *H02J 50/12* | (2016.01) | |
| *H02J 50/80* | (2016.01) | |
| *H02J 50/60* | (2016.01) | |
| *H02J 7/00* | (2006.01) | |

(52) U.S. Cl.
CPC .......... *H02J 50/12* (2016.02); *H02J 7/00045* (2020.01); *H02J 7/025* (2013.01); *H02J 50/60* (2016.02); *H02J 50/80* (2016.02)

(58) Field of Classification Search
CPC ........ H02J 5/005; H02J 7/00045; H02J 7/025; H02J 17/00; H02J 50/05; H02J 50/10; H02J 50/12; H02J 50/15; H02J 50/20; H02J 50/30; H02J 50/60; H02J 50/80
USPC ........................................................ 307/104
See application file for complete search history.

(56) References Cited

U.S. PATENT DOCUMENTS

| | | | |
|---|---|---|---|
| 9,577,467 B1 * | 2/2017 | Karanikos ............... | H02J 7/025 |
| 9,762,091 B2 | 9/2017 | Oosumi et al. | |
| 2008/0197802 A1 * | 8/2008 | Onishi .................... | H02J 50/60 |
| | | | 320/106 |
| 2009/0001932 A1 * | 1/2009 | Kamijo ............... | H04B 5/0037 |
| | | | 320/108 |
| 2009/0251008 A1 * | 10/2009 | Sugaya .................. | H02J 50/12 |
| | | | 307/104 |

(Continued)

FOREIGN PATENT DOCUMENTS

| | | |
|---|---|---|
| JP | 2010104097 A | 5/2010 |
| JP | 2016007116 A | 1/2016 |

*Primary Examiner* — Levi Gannon
(74) *Attorney, Agent, or Firm* — Rossi, Kimms & McDowell LLP

(57) ABSTRACT

A power receiving apparatus for wirelessly receiving a power from a power transmission apparatus that uses a power supplied from a power supply apparatus is provided. The power receiving apparatus obtains, from the power transmission apparatus, a result of first device authentication between the power supply apparatus and the power transmission apparatus, performs second device authentication for the power transmission apparatus, and performs a negotiation concerning a transmission power with the power transmission apparatus based on the result of the first device authentication and a result of the second device authentication.

21 Claims, 14 Drawing Sheets

(56) References Cited

U.S. PATENT DOCUMENTS

| | | | | |
|---|---|---|---|---|
| 2010/0264746 | A1* | 10/2010 | Kazama | H04W 52/18 |
| | | | | 307/104 |
| 2012/0001497 | A1* | 1/2012 | Sada | H02J 50/50 |
| | | | | 307/104 |
| 2012/0063505 | A1* | 3/2012 | Okamura | H02J 7/025 |
| | | | | 375/238 |
| 2013/0063083 | A1* | 3/2013 | Park | H02J 7/0013 |
| | | | | 320/108 |
| 2013/0257364 | A1* | 10/2013 | Redding | H01M 10/46 |
| | | | | 320/108 |
| 2016/0126749 | A1* | 5/2016 | Shichino | H02J 50/90 |
| | | | | 307/104 |
| 2016/0190871 | A1* | 6/2016 | Nago | H02J 50/40 |
| | | | | 307/104 |
| 2017/0141582 | A1* | 5/2017 | Adolf | H02J 50/12 |
| 2019/0296799 | A1* | 9/2019 | Park | H02J 50/10 |

* cited by examiner

FIG. 6

|  | USB AUTHENTICATION NONCOMPLIANT (600) | USB AUTHENTICATION FAIL (601) | USB AUTHENTICATION SUCCESS (602) |
|---|---|---|---|
| WPT AUTHENTICATION NONCOMPLIANT (603) | 5 | 0, 2.5, 5 | 5 |
| WPT AUTHENTICATION FAIL (604) | 0, 2.5, 5 | 0, 2.5, 5 | 0, 2.5, 5 |
| WPT AUTHENTICATION SUCCESS (605) | 5 | 0, 2.5, 5 | 15 |

FIG. 10A

| | bit7 | bit6 | bit5 | bit4 | bit3 | bit2 | bit1 | bit0 |
|---|---|---|---|---|---|---|---|---|
| Bank0 | Power Class | | Maximum Power Value | | | | | |
| Bank1 | Reserved | | | | | | | |
| Bank2 | Prop | Reserved | | | ZERO | Count | | |
| Bank3 | Window Size | | | | Window Offset | | | |
| Bank4 | Neg | Polarity | | Depth | | Reserved | | |

| | bit7 | bit6 | bit5 | bit4 | bit3 | bit2 | bit1 | bit0 |
|---|---|---|---|---|---|---|---|---|
| Bank0 | Power Class | | Guaranteed Power Value | | | | | |
| Bank1 | Reserved | | Potential Power Value | | | | | |
| Bank2 | Reserved | | | | | | WPID | Not Res Sens |

1010
1011

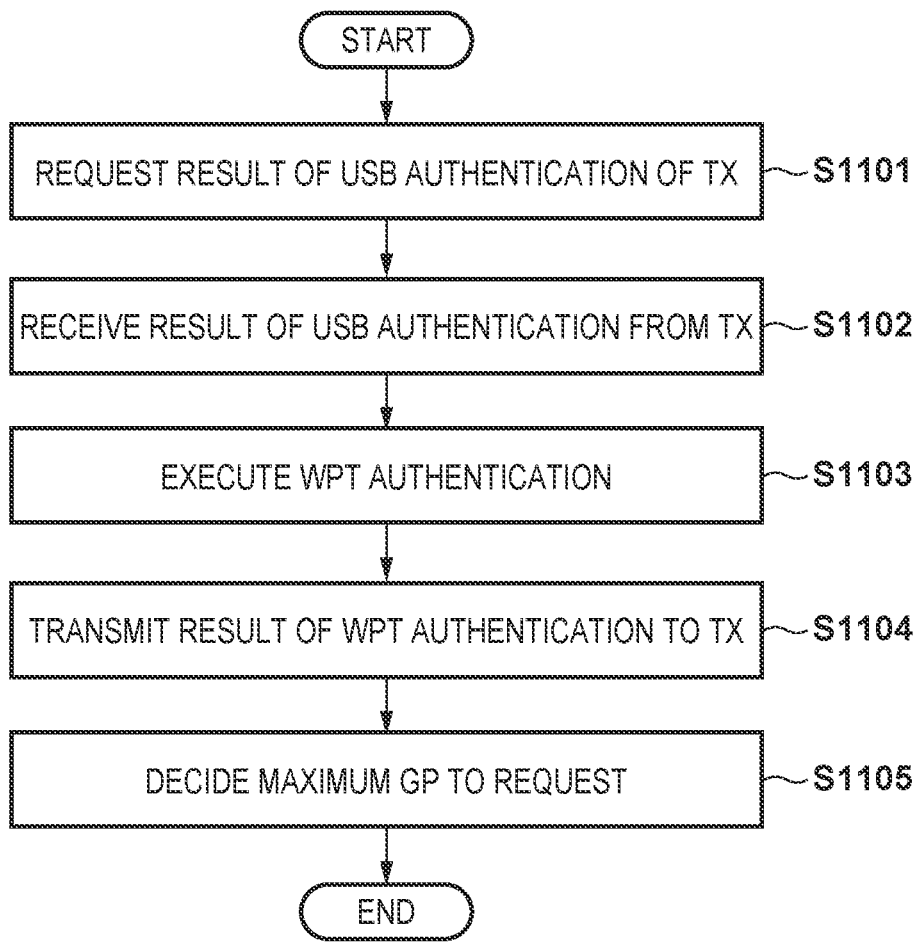
F I G. 11

POWER RECEIVING APPARATUS, POWER TRANSMISSION APPARATUS, CONTROL METHOD, AND NON-TRANSITORY COMPUTER-READABLE STORAGE MEDIUM

BACKGROUND OF THE INVENTION

Field of the Invention

The present invention relates to a wireless power transmission technique.

Description of the Related Art

In recent years, technological development of a wireless power transmission system has been widely conducted. Japanese Patent Laid-Open No. 2016-007116 describes a power transmission apparatus and a power receiving apparatus, which comply with a standard (to be referred to as "WPC standard" hereinafter) established by WPC (Wireless Power Consortium) that is the standardization organization of contactless charge standard. In addition, Japanese Patent Laid-Open No. 2010-104097 describes a device authentication method between a power transmission apparatus and a power receiving apparatus for contactless charge. According to Japanese Patent Laid-Open No. 2010-104097, the power transmission apparatus transmits challenge data to the power receiving apparatus via a power transmission coil, and the power receiving apparatus transmits response data created by performing an authentication operation for the challenge data to the power transmission apparatus via a power receiving coil. Then, the power transmission apparatus collates the response data received from the power receiving apparatus, thereby executing a device authentication protocol.

However, in a system that performs wireless power transmission between a power transmission apparatus and a power receiving apparatus, the convenience of the conventional device authentication method is sometimes insufficient. For example, in a case in which the communication method of Japanese Patent Laid-Open No. 2010-104097 is used, communication is performed assuming that both the power transmission apparatus and the power receiving apparatus have a device authentication function. For this reason, a power transmission apparatus having the device authentication function cannot appropriately communicate with a power receiving apparatus that complies with the conventional WPC standard and does not have the device authentication function. Also, for example, an arrangement in which the power transmission apparatus receives a power to be wirelessly transmitted to the power receiving apparatus from an external power supply apparatus (for example, an AC adapter) via a cable (for example, a USB cable) is known. In this arrangement, the power transmission apparatus can perform device authentication for the cable or the AC adapter. When the power transmission apparatus is compliant with a device authentication protocol to the power supply, and the power transmission apparatus and the power receiving apparatus are compliant with the above-described device authentication protocol via a power transmission coil and a power receiving coil, the wireless power transmission system can execute the plurality of types of device authentication protocols. However, the examination of an appropriate control method for such a wireless power transmission system capable of executing a plurality of types of device authentication protocols has not progressed.

SUMMARY OF THE INVENTION

The present disclosure improves the convenience of a system configured to perform wireless power transmission between a power transmission apparatus and a power receiving apparatus.

According to one aspect of the present disclosure, there is provided a power receiving apparatus for wirelessly receiving a power from a power transmission apparatus that uses a power supplied from a power supply apparatus, comprising: an obtaining unit configured to obtain, from the power transmission apparatus, a result of first device authentication between the power supply apparatus and the power transmission apparatus; an authentication unit configured to perform second device authentication for the power transmission apparatus; and a negotiation unit configured to perform a negotiation concerning a transmission power with the power transmission apparatus based on the result of the first device authentication and a result of the second device authentication.

According to another aspect of the present disclosure, there is provided a power transmission apparatus for wirelessly transmitting a power to a power receiving apparatus, comprising: an authentication unit configured to perform device authentication for the power receiving apparatus; a notification unit configured to notify the power receiving apparatus that the power transmission apparatus has a capability of performing the device authentication; a determination unit configured to determine, based on a response of the power receiving apparatus to the notification by the notification unit, whether the power receiving apparatus is compliant with the device authentication; and an execution unit configured to execute the device authentication by the authentication unit based on that the determination unit determines that the power receiving apparatus is compliant with the device authentication.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 6 is a view showing the relationship between the result of device authentication and the set value of GP;

FIG. 10A is a view showing the structure of a Configuration Packet;

FIG. 10B is a view showing the structure of a Power Transmitter Capability Packet; and FIG. 11 is a flowchart showing setting processing of GP by the control unit of the power receiving apparatus.

DESCRIPTION OF THE EMBODIMENTS

An exemplary embodiment(s) of the present disclosure will now be described in detail with reference to the drawings. It should be noted that the relative arrangement of the components, the numerical expressions and numerical values set forth in these embodiments do not limit the scope of the present disclosure unless it is specifically stated otherwise.

(System Arrangement)

Figure 3:
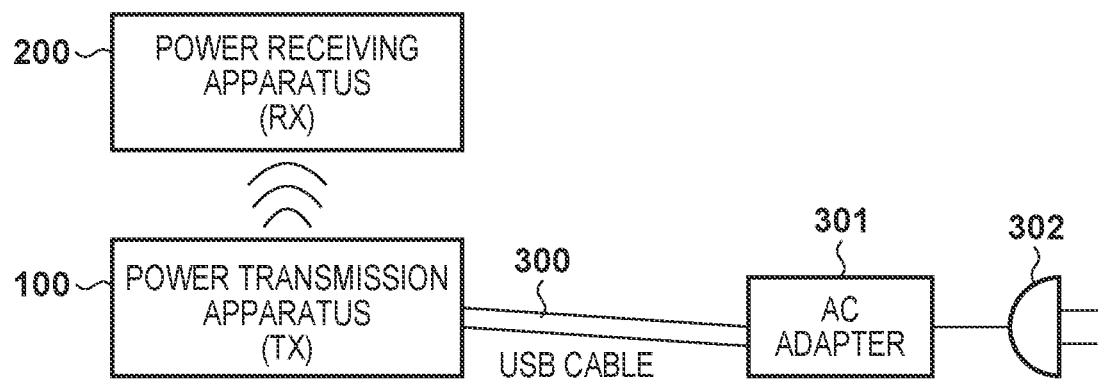
FIG. 3 is a block diagram showing an example of the arrangement of a contactless charge system.

FIG. 3 shows an example of the arrangement of a wireless power transmission system (contactless charge system) according to this embodiment. Referring to FIG. 3, a power transmission apparatus (to be referred to as "TX 100" hereinafter) transmits the power supplied by wire using an AC adapter 301, a USB cable 300, and the like to a power receiving apparatus (to be referred to as "RX 200" hereinafter) wirelessly. The RX 200 receives the power wirelessly transmitted from the TX 100 and charges, for example, a battery provided inside the RX 200. The AC adapter 301 converts the power of a commercial power supply supplied via a power plug 302 into a voltage suitable for the TX 100 and supplies it to the TX 100. Note that the arrangement shown in FIG. 3 is merely an example, and an arrangement other than this may be used. For example, the power supply by wire may be performed in accordance with a standard other than USB as long as device authentication can be performed. For this reason, it is assumed below that the power supply by wire is performed in accordance with the Power-Delivery standard, and device authentication is performed based on the Authentication standard supported by the USB Power-Delivery standard. However, standards other than these may be used. FIG. 3 shows one TX 100 and one RX 200. However, a plurality of TXs 100 may receive the power supplied by wire and transmit the power to one common RX 200 or separate RXs 200, respectively. Alternatively, one TX 100 may transmit the power to a plurality of RXs 200. Note that a case in which contactless charge complying with the WPC (Wireless Power Consortium) standard is performed between the TX 100 and the RX 200 will be described below. However, the present disclosure is not limited to this, and contactless charge may be performed based on another standard.

(Apparatus Arrangement)

An example of the arrangement of each of the power transmission apparatus (TX 100) and the power receiving apparatus (RX 200) usable in the contactless charge system shown in FIG. 3 will be described next.

Figure 1:
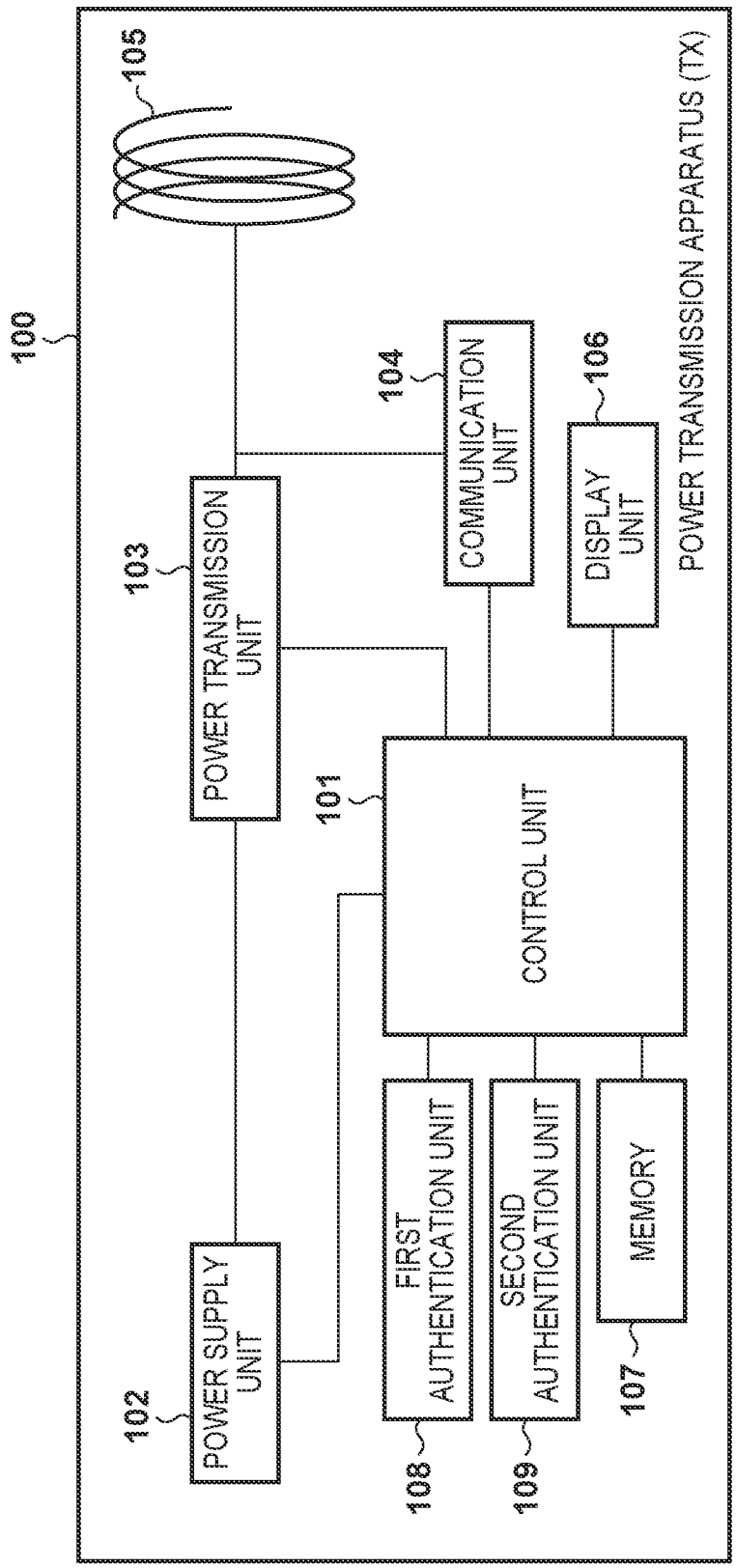
FIG. 1 is a block diagram showing an example of the arrangement of a power transmission apparatus.

FIG. 1 is a block diagram showing an example of the arrangement of the TX 100. The TX 100 complies with the WPC standard and also has a function defined by version 1.2.2 (to be referred to as the WPC standard v1.2.2 hereinafter) of the WPC standard. Here, the TX 100 has a power supply capability of outputting a power of 15 W at maximum to the charge unit of the RX 200 compliant with the WPC standard, like the TX 100. In one example, the TX 100 can include a control unit 101, a power supply unit 102, a power transmission unit 103, a communication unit 104, a power transmission coil 105, a display unit 106, a memory 107, a first authentication unit 108, and a second authentication unit 109.

The control unit 101 includes at least one processor such as a CPU (Central Processing Unit) or an MPU (Micro Processing Unit) and controls the entire TX 100. Note that the control unit 101 may include, for example, an ASIC (Application Specific Integrated Circuit) or an FPGA (Field Programmable Gate Array).

The power supply unit 102 receives a power for the operation of the TX 100 from the AC adapter 301 via the USB cable 300, and supplies a power to cause at least the control unit 101 and the power transmission unit 103 to operate. The power supply unit 102 is configured to be compliant with device authentication of the power supply apparatus and power supply by wire. The power supply unit 102 can be compliant with the USB Power-Delivery standard to receive the power supplied via the USB cable 300, as shown in FIG. 3, and the Authentication standard to perform device authentication between connected USB devices. Note that the TX 100 may comply with a standard other than the USB Power-Delivery standard to receive supply of the power, or may perform device authentication in accordance with a standard other than the Authentication standard. Hence, the power supply unit 102 can be configured to be compliant with a standard other than these standards. In addition, the power supply unit 102 (or the first authentication unit 108 to be described later) may be configured to be compliant with a plurality of standards. For example, a standard to be used may be determined based on the form of connection with the power supply source (for example, based on which terminal of the TX 100 is used).

The power transmission unit 103 generates an alternating voltage and an alternating current to be transmitted to the RX 200 via the power transmission coil 105. The power transmission unit 103 can convert, for example, a direct voltage supplied from the power supply unit 102 into an alternating voltage using a switching circuit having a half-bridge or full-bridge structure using an FET. In this case, the power transmission unit 103 can include a gate driver configured to on/off-control the FET.

Figure 2:
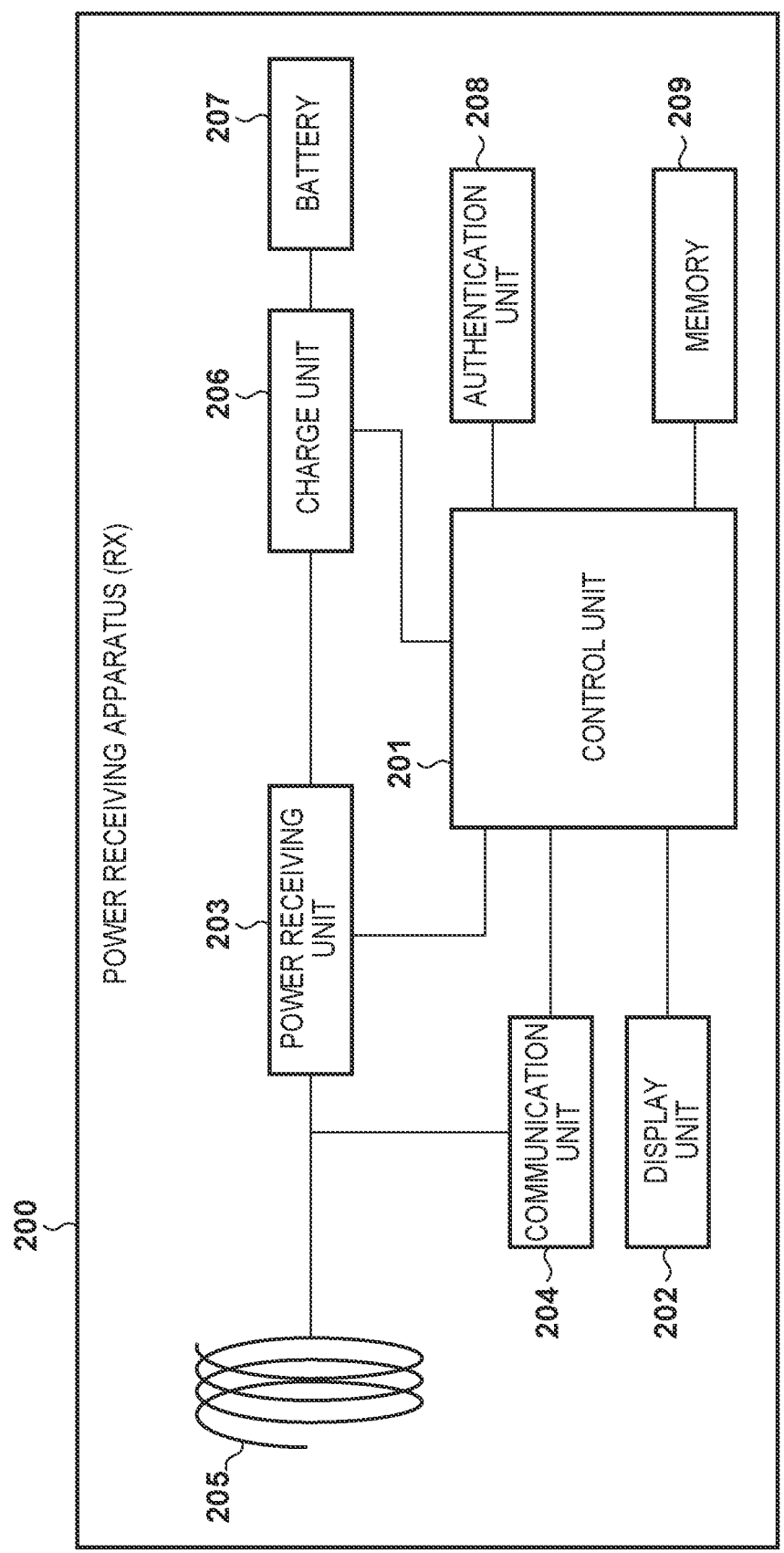
FIG. 2 is a block diagram showing an example of the arrangement of a power receiving apparatus.

The communication unit 104 performs control communication concerning the control of contactless charge based on the WPC standard with the RX 200 (a communication unit 204 shown in FIG. 2). The communication unit 104 can perform the communication with the RX 200 by so-called in-band communication that modulates the alternating voltage or current generated by the power transmission unit 103 and superimposes information on the wireless power. However, the present disclosure is not limited to this, and the communication unit 104 may perform the communication with the RX 200 by out-band communication in which at least a part of a frequency band for communication is not included in a frequency band for power transmission. The out-band communication can be performed by, for example, NFC, RFID, Bluetooth Low Energy, or the like.

The display unit 106 displays the information of the state of the TX 100 or the state of the contactless charge system including devices such as the TX 100, the RX 200, the USB cable 300, and the AC adapter 301 as shown in FIG. 3 such that the user can confirm the information. The display unit 106 can be formed by, for example, an LED (Light Emitted Diode). However, the present disclosure is not limited to this, and the display unit 106 may include, for example, a speaker, a vibration generation circuit, a display, and the like in place of or in addition to the LED. The memory 107 stores the states of the whole and the elements of the TX 100 and the contactless charge system shown in FIG. 3.

The first authentication unit 108 performs device authentication for the power supply unit 102, and the USB cable 300 and the AC adapter 301, which are connected to the power supply unit 102. In this embodiment, the first authentication unit 108 performs device authentication complying with the USB Authentication standard. However, the present disclosure is not limited to this, and another standard compliant with device authentication, for example, the Quick Charge standard of Qualcomm may be used. The second authentication unit 109 performs device authentication between the TX 100 and the RX 200 by communication via the communication unit 104. In this embodiment, the device authentication performed by the second authentication unit 109 is called Wireless Power Transfer authentication or WPT authentication.

Note that in FIG. 1, the control unit 101, the power supply unit 102, the power transmission unit 103, the communication unit 104, the memory 107, the first authentication unit 108, and the second authentication unit 109 are illustrated as separate blocks. However, a plurality of arbitrary blocks of these may be implemented in the same chip. For example, the power supply unit 102 compliant with USB Power-Delivery and the first authentication unit 108 compliant with the USB Authentication standard may be implemented in one chip as a USB-associated chip. In this case, the TX 100 can be configured to connect the control unit 101 and the USB-associated chip by, for example, GPIO (General Purpose Input/Output) or serial communication. Additionally, for example, a plurality of arbitrary blocks of the second authentication unit 109, the control unit 101, the memory 107, the power transmission unit 103, and the communication unit 104 may be implemented in the same chip. Also, one block shown in FIG. 1 may be divided into a plurality of blocks and may be implemented by a plurality of chips in some cases.

FIG. 2 is a block diagram showing an example of the arrangement of the RX 200. The RX 200 also complies with the WPC standard and also has a function defined by the WPC standard v1.2.2, like the TX 100. In one example, the RX 200 can include a control unit 201, a display unit 202, a power receiving unit 203, the communication unit 204, a power receiving coil 205, a charge unit 206, a battery 207, an authentication unit 208, and a memory 209.

The control unit 201 includes at least one processor such as a CPU or an MPU, an ASIC, or an FPGA and controls the entire RX 200. The display unit 202 displays the information of the power supply state or the charge state of the RX 200 such that the user can confirm the information. In this embodiment, the display unit 202 is an LED but may include, for example, a speaker, a vibration generation circuit, and a display in place of or in addition to the LED.

The power receiving unit 203 receives, via the power receiving coil 205, an electromagnetic wave radiated from the power transmission coil 105, and converts an alternating voltage and an alternating current obtained by the power reception into a direct voltage and a direct current to be used when the control unit 201, the charge unit 206, and the like operate. Note that in this embodiment, the power receiving unit 203 has a capability of outputting a power of 15 W at maximum to the charge unit 206.

The communication unit 204 performs control communication concerning the control of contactless charge based on the WPC standard with the communication unit 104 of the TX 100. This control communication can be performed by load modulation, in which the load on the side of the RX 200 is varied to change the state of power transmission between the TX 100 and the RX 200, thereby varying the current flowing to the power transmission coil 105 and thus transmitting information. Note that the communication unit 204 may perform the control communication by in-band communication such as the load modulation, or may perform the control communication by out-band communication in which at least a part of a frequency band for communication is not included in a frequency band for power transmission. However, the present disclosure is not limited to this, and out-band communication using a frequency different from the frequency of the power transmission unit 103 may be used. As described above, the out-band communication can be performed by, for example, NFC, RFID, Bluetooth Low Energy, or the like.

The charge unit 206 charges the battery 207 using the direct voltage and the direct current supplied from the power receiving unit 203. The authentication unit 208 performs WPT authentication for the second authentication unit 109 of the TX 100 by communication via the communication unit 204. The memory 209 stores the information of the states of the whole and the elements of the RX 200 and the contactless charge system shown in FIG. 3. Note that that the TX 100 or the RX 200 is compliant with the WPC standard including WPT authentication will be expressed as "compliant with the WPC standard version A" hereinafter. Here, the WPC standard version A is the standard to replace the WPC standard v1.2.2, and at least the WPT authentication function is added.

Note that in FIG. 2, the power receiving unit 203, the authentication unit 208, the control unit 201, the memory 209, the communication unit 204, and the charge unit 206 are illustrated as separate blocks. However, a plurality of arbitrary blocks of these may be implemented in the same chip. Also, one block shown in FIG. 2 may be divided into a plurality of blocks and may be implemented by a plurality of chips in some cases.

In the contactless charge system according to this embodiment, the first authentication unit 108 of the TX 100 performs device authentication (for example, USB authentication via the USB cable) using a first communication protocol with the AC adapter 301 and the USB cable 300. In addition, the second authentication unit 109 of the TX 100 performs device authentication for the RX 200 using a second communication protocol using a medium (for example, the power transmission coil 105 and the power receiving coil 205) different from that of the first communication protocol. In this embodiment, the AC adapter 301, the USB cable 300, and the TX 100 (power supply unit 102) are USB devices. When the USB devices are compliant with USB authentication and succeed in USB authentication, it can be confirmed that a problem such as excessive heating does not arise even if a power defined by the USB authentication is applied to the devices. That is, it can be said that in a case of success of USB authentication, when the defined power is supplied from the AC adapter 301 to the power supply unit 102 of the TX 100 via the USB cable 300, the power supply unit 102 of the TX 100, the USB cable 300, and the AC adapter 301 do not excessively generate heat.

On the other hand, if one of the power supply unit 102, the USB cable 300, and the AC adapter 301 is not compliant with the USB authentication, the device never succeeds in the USB authentication. In this case, if the power defined by the USB authentication is applied, a problem that, for example, one of the devices and the cable excessively generates heat may occur. Here, the devices noncompliant with the USB authentication include a device compliant with one of a plurality of versions of USB standards before the establishment of the USB authentication standard. In this embodiment, a USB device compliant with one of the plurality of versions of USB standards before the establishment of the USB authentication standard is called a legacy USB device. In addition, if one of the power supply unit 102, the USB cable 300, and the AC adapter 301 fails in the USB authentication, a problem such as heating may occur when the power defined by the USB authentication is applied. Here, "fails in USB authentication" includes a case in which at least one of the USB cable 300 and the AC adapter 301 can be a USB device that is nominally compliant with the USB authentication but noncompliant in fact.

In addition, in a case in which the TX 100 and the RX 200 are compliant with the WPC standard version A and succeed in WPT authentication, even if the RX 200 and the TX 100 exchange the predetermined power defined by the standard, a problem that they excessively generate heat does not occur. On the other hand, in a case in which at least one of the RX 200 and the TX 100 is not compliant with the WPC standard version A, when the above-described defined power is applied, a problem that the device that is not compliant with the WPC standard version A excessively generates heat may occur. Here, the devices noncompliant with the WPC standard version A include a device compliant with one of a plurality of versions of WPC standards before the WPC standard version A. In this embodiment, a TX or RX compliant with one of the plurality of versions of WPC standards before the WPC standard version A is called a legacy TX or RX.

Additionally, "fails in WPT authentication between the TX 100 and the RX 200" includes a case in which these devices are nominally compliant with the WPT authentication but noncompliant in fact. Note that WPT authentication between devices compliant with the WPT authentication always succeeds. In this case as well, since WPT authentication does not succeed, when the above-described defined power is applied, a problem such as excessive heating may occur.

In this embodiment, when the USB cable 300 and the AC adapter 301 succeed in the USB authentication, and the RX 200 and the TX 100 succeed in the WPT authentication, it is determined that the predetermined power defined by the standard can be supplied. That is, in a state in which a problem such as excessive heating does not arise, the power receiving unit 203 of the RX 200 can supply the predetermined power (15 W) to the load (the charge unit 206 in this embodiment). On the other hand, when one of the TX 100 (power supply unit 102), the USB cable 300, and the AC adapter 301 does not succeed in the USB authentication, and one of the RX 200 and the TX 100 does not succeed in the WPT authentication, a problem may occur in the supply of the predetermined power. That is, when the power receiving unit 203 of the RX 200 supplies the predetermined power of 15 W to the load, a problem such as excessive heating may occur. In the following explanation, to avoid such a risk, if the authentication is not successfully done, the power supplied by the power receiving unit 203 is limited to a power (for example, 5 W or less) smaller than the predetermined power (15 W).

(Procedure of Processing)

Figure 4:
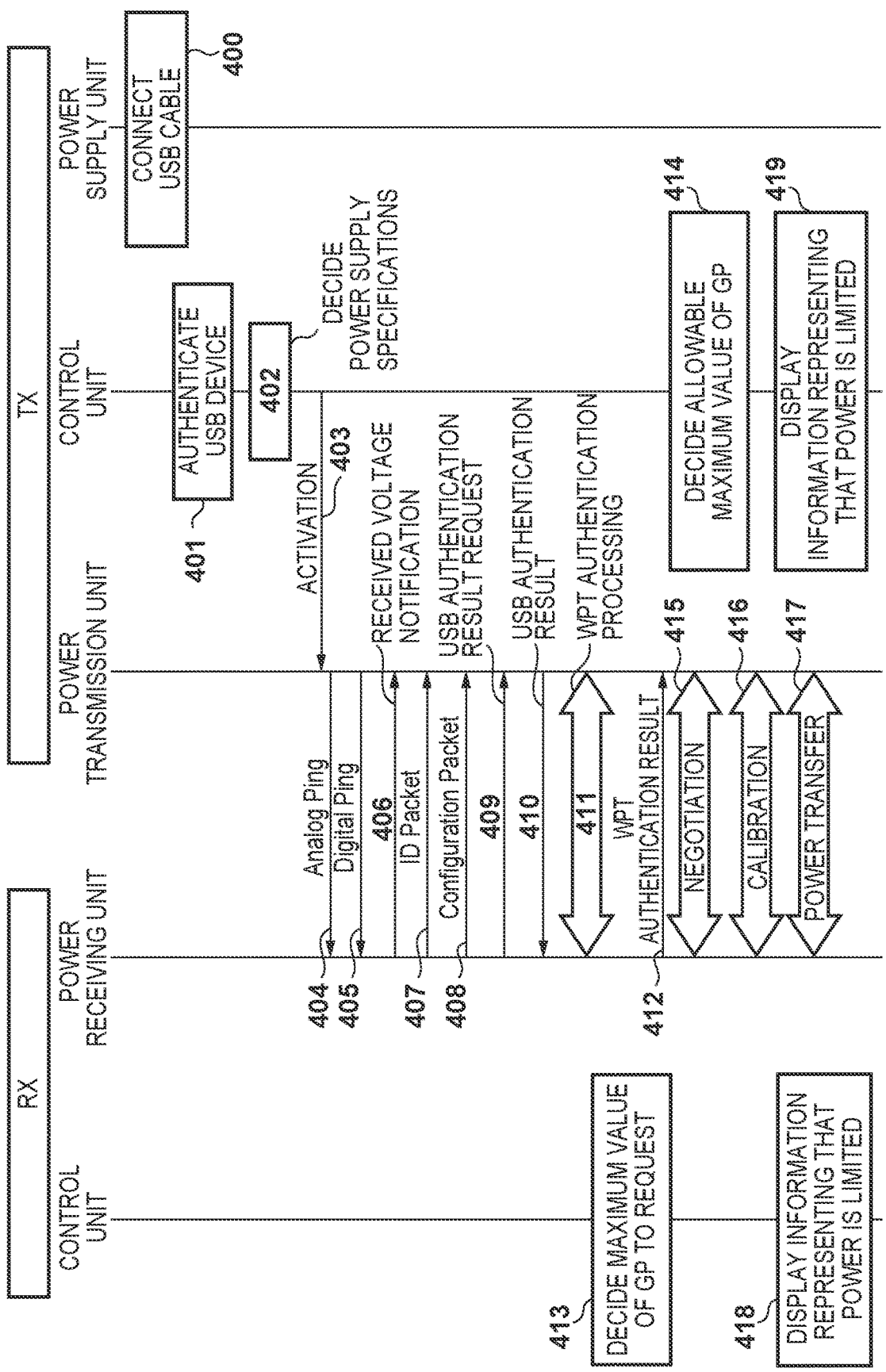
FIG. 4 is an operation sequence chart of the contactless charge system including USB authentication and WPT authentication.
Figure 5:
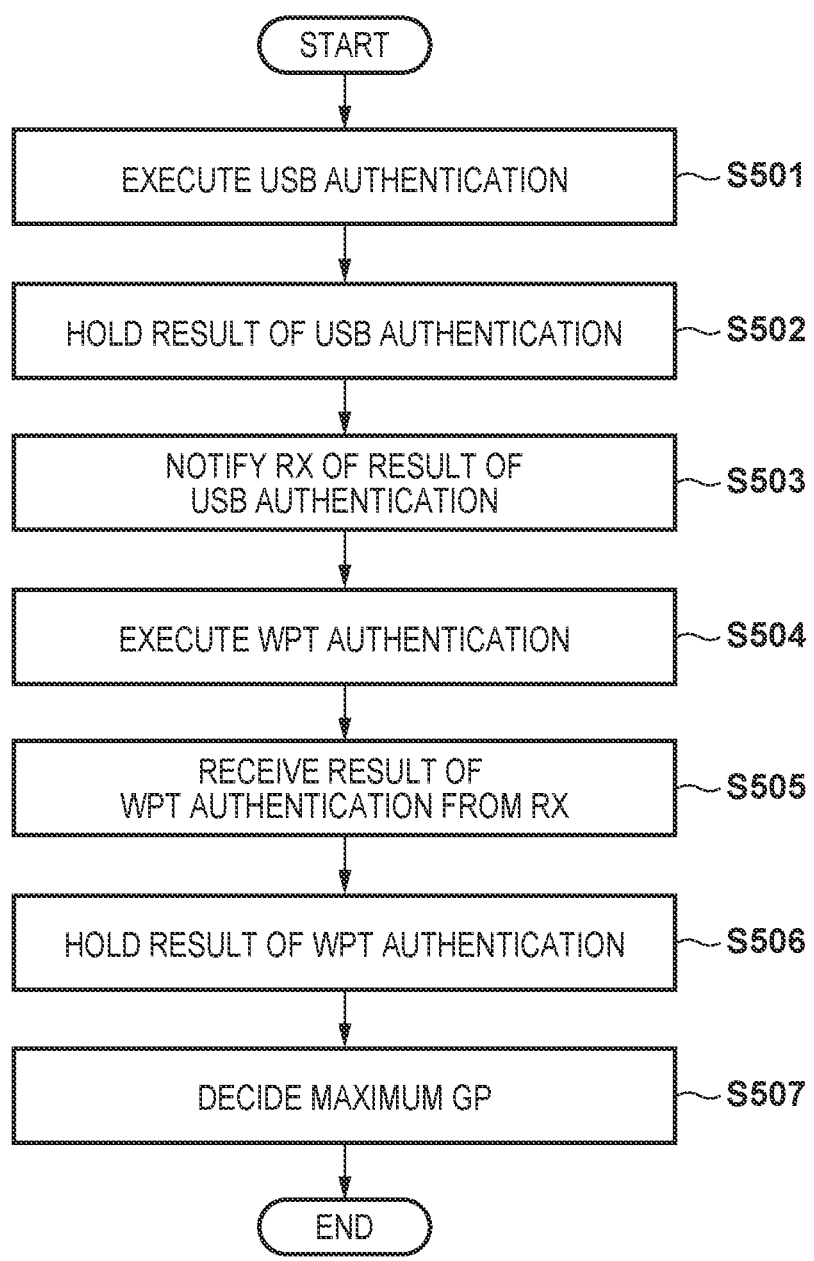
FIG. 5 is a flowchart showing setting processing of GP by the control unit of the power transmission apparatus.

An example of the procedure of processing executed by the contactless wireless communication system will be described next. FIG. 4 is a sequence chart showing an example of the procedure of processing including USB authentication and WPT authentication executed in this embodiment. In addition, FIG. 5 is a flowchart showing an example of the procedure of processing executed by the control unit 101 of the power transmission apparatus (TX 100) concerning setting of a Guaranteed Power (to be referred to as GP hereinafter) according to this embodiment. Additionally, FIG. 11 is a flowchart showing an example of the procedure of processing executed by the control unit 201 of the power receiving apparatus (RX 200) concerning setting of the GP. Here, GP is a power value guaranteed by the TX 100 concerning the power output from the power receiving unit 203 to the load even if the position relationship between the TX 100 and the RX 200 is shifted, and the power transmission efficiency between the power transmission coil 105 and the power receiving coil 205 lowers. The load of the power receiving unit 203 is the target to which the power receiving unit 203 supplies a power, and includes at least the charge unit 206. For example, in a case in which the GP is 5 W, the TX 100 controls the power transmission unit 103 such that the power receiving unit 203 can output a power of 5 W even if the position relationship between the power transmission coil and the power receiving coil is shifted, and the power transmission efficiency between the coils lowers. In this embodiment, the GP is limited in accordance with the result of authentication. This can prevent a problem such as excessive heating caused by transmission of the power defined by the standard in a case in which, for example, authentication does not succeed, or a device is noncompliant with the authentication. First, an example of the limit values of GP used in negotiation to be described later in accordance with the results of USB authentication and WPT authentication will be described with reference to FIG. 6.

"Noncompliant with USB authentication" in a column 600 represents that at least one of the power supply unit 102 of the TX 100, the USB cable 300, and the AC adapter 301 is not compliant with USB authentication (however, a device compliant with USB authentication succeeds in authentication). "Fail in USB authentication" in a column 601 represents that at least one of the power supply unit 102 of the TX 100, the USB cable 300, and the AC adapter 301 is (at least nominally) compliant with USB authentication but fails in USB authentication. "Succeed in USB authentication" in a column 602 represents that all of the power supply unit 102 of the TX 100, the USB cable 300, and the AC adapter 301 succeed in USB authentication. A row 603 shows that the RX 200 is not compliant with WPT authentication, a row 604 shows that the RX 200 is compliant with WPT authentication but fails in WPT authentication, and a row 605 shows that the RX 200 is compliant with WPT authentication and succeeds in WPT authentication. Note that for each of the fields in which three types of GP power values "0, 2.5, and 5" are described in the table, a setting to employ one of the power values is done in advance.

According to FIG. 6, when a device is noncompliant with USB authentication (column 600), the GP is limited to 5 W independently of the result of WPT authentication, thereby avoiding excessive heating or the like. When WPT authentication fails (row 604) in the column 600, the GP may be limited to a smaller value such as 0 W (power transmission is not performed) or 2.5 W (smaller than 5 W) as compared to a case in which the RX is noncompliant with WPT authentication (row 603). This is because the failure of WPT authentication means that there is a possibility that the RX is, for example, a fake that nominally implements WPT authentication but not formally implements and does not meet the WPC standard. From the viewpoint of excessive heating or the like, the GP is limited to 5 W. On the other hand, when the GP is limited to a GP (0 W or 2.5 W) lower than that of a legacy RX that is noncompliant with WPT authentication but formally implements the standard, it is possible to suppress or avoid power transmission to a fake that appears to be compliant with WPT authentication.

Similarly, when USB authentication fails (column 601), the GP may be limited to a smaller value such as 0 W (power transmission is not performed) or 2.5 W (smaller than 5 W) independently of the result of WPT authentication as compared to a case in which the device is noncompliant with USB authentication (column 600). This is because the failure of USB authentication means that there is a possibility that the USB device that is the authentication target is, for example, a fake that nominally implements USB authentication but not formally implements. Hence, when the GP is limited to a lower GP of 0 W or 2.5 W as compared to a legacy USB device that is noncompliant with USB authentication but formally implements the standard, it is possible to suppress or avoid supply of power from a fake that appears to be compliant with USB authentication.

When USB authentication succeeds (column 602), concerning the power supply unit 102 of the TX 100, the USB cable 300, and the AC adapter 301, excessive heating or the like does not occur even if the RX 200 supplies a GP of 15 W (the maximum value of the GP that the TX 100 can supply to the RX 200) to the load. For this reason, the TX 100 sets the GP based on the result of WPT authentication. For example, the TX 100 limits the GP to 5 W due to the above-described reason in a case in which the RX is noncompliant with WPT authentication (row 603), and limits the GP to a lower value (0 W or 2.5 W) in a case in which WPT authentication fails (row 604). If USB authentication succeeds (column 602), and WPT authentication also succeeds (row 605), the TX 100 determines that the problem of excessive heating or the like does not occur, and sets the limit value of the GP to 15 W that is the maximum value of the power transmission capability of the TX 100 and the power receiving capability of the RX 200. Alternatively, the RX 200 may request, as the GP of the TX 100, 15 W that is the maximum value of the power transmission capability of the TX 100 and the power receiving capability of the RX 200.

In this way, the TX 100 can decide the maximum value of the GP allowable in a negotiation in a negotiation phase to be described later based on the USB authentication result and the WPT authentication result, and the set values as shown in FIG. 6. In addition, the RX 200 can decide the maximum value of the GP to be requested of the TX 100 in a negotiation in the negotiation phase based on the USB authentication result and the WPT authentication result, and the set values as shown in FIG. 6. Note that when both USB authentication and WPT authentication succeed, a transmission power according to the maximum capability of the TX 100 and the RX 200 can be decided in a negotiation in the negotiation phase.

An example of the procedure of processing from activation to power transmission of the contactless charge system shown in FIG. 3 will be described next with reference to FIGS. 4, 5, and 11. If at least one of devices that are the targets authentication in USB authentication and WPT authentication is noncompliant with the authentication or fails in the authentication, the RX 200 operates not to request the TX 100 to send a large power as the GP.

First, when the USB cable 300 and the AC adapter 301 are connected to the power supply unit 102 of the TX 100 (400), the control unit 101 of the TX 100 performs USB authentication (401, step S501). In the USB authentication, the control unit 101 operates the first authentication unit 108 and determines whether all USB devices (in the embodiment, both the USB cable 300 and the AC adapter 301) as the authentication targets are compliant with USB authentication. The first authentication unit 108 executes the USB authentication for all the USB devices, and if all the executed USB authentications succeed, determines "USB authentication success". In this embodiment, "USB authentication noncompliant" and "USB authentication failure" are provided as authentication results in a case in which one of the USB authentications does not succeed. If there exists at least one device that is compliant with USB authentication but fails in the authentication, the first authentication unit 108 determines "USB authentication failure". In addition, the first authentication unit 108 may determine one of "USB authentication failure" and "USB authentication noncompliant" based on the attribute of the device that fails in the authentication. For example, if a device that fails in the authentication exists, the first authentication unit 108 can specify the attribute of the device and execute determination corresponding to the attribute. In addition, if all devices that fail in the USB authentication are devices that are noncompliant with the USB authentication, the first authentication unit 108 determines "USB authentication noncompliant".

For example, if the AC adapter 301 succeeds in the USB authentication, but the USB cable 300 is not compliant with the USB authentication, "USB authentication noncompliant" is determined. Additionally, for example, if the AC adapter 301 succeeds in the USB authentication, and the USB cable 300 is compliant with the USB authentication but fails in the authentication, "USB authentication noncompliant" is determined. If both the AC adapter 301 and the USB cable 300 succeed in the USB authentication, "USB authentication success" is determined. The control unit 101 holds the USB authentication result in the memory 107 (step S502).

Next, the control unit 101 decides power supply specifications concerning a voltage and a current to be supplied from the AC adapter 301 with respect to the AC adapter 301 based on the sequence of USB PD (USB-Power Delivery standard) (402). Since the power supply voltage is determined by the internal arrangement of the TX 100, the current value is decided in this case. In this embodiment, assume that the voltage of the power supply unit 102 is 15 V, and the output current of the power supply unit 102 is 3 A at maximum. Here, when reducing the current value, the control unit 101 of the TX 100 determines the reduction range of the current value based on the settings as shown in FIG. 6. For example, in a case of USB authentication noncompliant, the maximum value of the GP allowable in a negotiation in the negotiation phase (to be described later) of the WPC standard is decided to 5 W based on the column 600 in FIG. 6. The control unit 101 then decides the current value in consideration of a loss in the TX 100. For example, assume that when the positions of the power transmission/reception coils change, and the inter-coil efficiency is the lowest, the system efficiency obtained when the RX 200 outputs a GP of 5 W is 50%. In this case, the power supplied from the power supply unit 102 to the power transmission unit 103 or the control unit 101 is 10 W (5 W×2). Hence, since the power supply voltage is 15 V, the output current is 10 W/15 V=0.67 A. In this embodiment, if a USB device is noncompliant with USB authentication, the GP is limited to 5 W. For this reason, the current value that should be decided by the power supply unit 102 by a negotiation with the AC adapter 301 based on the sequence of USB PD is about 0.67 A. Based on the current value to be decided, the control unit 101 of the TX 100 decides the power supply specifications with respect to the AC adapter 301. On the other hand, if the USB authentication succeeds, the control unit 101 decides the power supply specifications to 2.0 A (15 W×2/15 V) so as to be compliant with the GP value of 15 W.

Then, the control unit 101 of the TX 100 activates the power transmission unit 103 (403). Activation of the power transmission unit 103 can be, for example, so-called power-on reset in which the power supply unit 102 powers on at least one of the control unit 101, the power transmission unit 103, and the communication unit 104. Alternatively, the first authentication unit 108 may input a reset signal (LO: about 0 V) (not shown) to at least one of the control unit 101, the power transmission unit 103, and the communication unit 104 of the TX 100, thereby resetting at least one of these functional units. In this case, after the power supply specifications are decided, and the value of the GP is decided, the first authentication unit 108 changes the reset signal to HI (for example, 3.3 V) to cancel the reset.

When the power transmission unit 103 is activated, the TX 100 starts an operation complying with the WPC standard. In this embodiment, in addition to the phase complying with the WPC standard, an authentication phase is defined as a phase to perform WPT authentication. In the authentication phase, the TX and the RX execute device authentication based on WPT authentication. If both the TX and the RX are compliant with the authentication phase, the TX and the RX first execute processing of a Selection phase (to be referred to as "selection phase" hereinafter). Then, the phase transitions to a ping phase and an identification & configuration phase (to be referred to as "I & C phase" hereinafter), and after that, the authentication phase is executed. Furthermore, after the authentication phase, processes are executed in the order of a negotiation phase, a calibration phase, and a power transfer phase (to be referred to as "PT phase" hereinafter).

In the selection phase, the power transmission unit 103 transmits Analog Ping via the power transmission coil 105 (404). The Analog Ping is a signal of a small power used to detect an object existing near the power transmission coil 105. The TX 100 detects the voltage value or current value of the power transmission coil 105 at the time of transmission of the Analog Ping. If the voltage is less than a threshold, or if the current value exceeds a threshold, it is determined that an object exists, and the phase transitions to the Ping phase.

In the Ping phase, the TX 100 transmits Digital Ping whose power is larger than the Analog Ping (405). As for the magnitude of the Digital Ping, the Digital Ping has a power enough to activate the control unit 201 of the RX 200 existing near the power transmission coil 105. When activated by the Digital Ping received via the power receiving coil 205, the control unit 201 of the RX 200 notifies the TX 100 of the magnitude of the received voltage (406) and transitions to the I & C phase. In addition, upon receiving the notification of the received voltage value, the TX 100 transitions to the I & C phase.

In the I & C phase, the RX 200 transmits an ID Packet and a Configuration Packet to the TX 100 (407, 408). To the Configuration Packet transmitted by the RX 200, the TX 100 responds by acknowledge (ACK). Then, the TX 100 and the RX 200 end the I & C phase and transition to the authentication phase. When the I & C phase ends, the TX 100 and the RX 200 can transmit data to each other. Here, the RX 200 transmits a USB authentication result request to the TX 100 (409, step S1101), and the TX 100 transmits the USB authentication result to the RX 200 (410, steps S503 and S1102). Note that the notification of the USB authentication result here may include the result of each USB-authenticated device (in this case, the USB cable 300 and the AC adapter 301), or may include information that integrates the authentication results of the USB cable 300 and the AC adapter 301. For example, when both the USB cable 300 and the AC adapter 301 succeed in the USB authentication, the RX 200 can be notified of "USB authentication success". When one of the devices fails in the USB authentication, the RX 200 can be notified of "USB authentication failure".

Next, in the authentication phase, the authentication unit 208 executes WPT authentication processing for the TX 100 (411, step S1103). The authentication target of this authentication processing is the TX 100 serving as the power transmission apparatus in the wireless power transmission system. Note that details of the authentication phase will be described later. The control unit 201 holds the result of WPT authentication in the memory 209. The control unit 201 then notifies the TX 100 of the WPT authentication result (412, step S1104). Based on the received USB authentication result, the WPT authentication result held in the memory 209, and the settings as shown in FIG. 6, the control unit 201 decides the maximum value of the GP to be requested in the negotiation phase (413, step S1105).

Similarly, the second authentication unit 109 of the TX 100 executes WPT authentication processing in the authentication phase (411, step S504). Here, the TX 100 undergoes authentication of the authenticity of its own by the RX 200. The control unit 101 receives the WPT authentication result from the RX 200 (412, step S505), and holds the WPT authentication result in the memory 107 (step S506). Based on the USB authentication result held in step S502, the WPT authentication result held in step S506, and the settings shown in FIG. 6, the control unit 101 decides the maximum value of the GP allowable in the negotiation phase (414, step S507).

After that, the control unit 101 of the TX 100 decides the GP by a negotiation with the RX 200 in the negotiation phase (415). Here, the negotiation of the transmission power is performed based on the result of device authentication by the first authentication unit 108 (USB authentication) and the second authentication unit 109 (WPT authentication). For example, when the result of USB authentication is "USB authentication success", and the result of WPT authentication is "WPT authentication success", the setting of the GP shown in FIG. 6 is allowed up to 15 W. On the other hand, if the result of USB authentication is "USB authentication noncompliant", the GP is limited to 5 W or less. In this case, in the negotiation phase, when the control unit 201 of the RX 200 requests a GP more than 5 W, the control unit 101 of the TX 100 transmits a NAK to the request. On the other hand, if a GP equal to or less than the limit value is requested, the control unit 101 transmits an acknowledge (ACK).

In the above-described way, the control unit 101 of the TX 100 decides the allowable maximum value of the GP based on the results of both the USB authentication and the WPT authentication and the settings shown in FIG. 6. For this reason, if one of the plurality of authentications fails, the magnitude of the GP is limited, and excessive heating or the like can be prevented. In addition, when all the authentications succeed, the control unit 101 can set the GP to the maximum value of the capability of the power transmission unit 103. Before the negotiation, the RX 200 requests the USB authentication result of the TX 100 and receives the USB authentication result from the TX 100. This allows the RX 200 to decide the maximum value of the GP in consideration of the USB authentication result between the TX 100 and each of the USB cable 300 and the AC adapter.

After that, the control unit 101 of the TX 100 and the control unit 201 of the RX 200 execute the processing of the calibration phase (416), and transition to the PT phase. In the PT phase, a power is transmitted from the TX 100 to the RX 200 (417), and the RX 200 supplies the power to the load based on the reception power. At this time, the control unit 201 of the RX 200 may display, on the display unit 202, information concerning the power receiving state representing whether the reception power is limited (418). The control unit 201 can control the display unit 202 so as to, for example, display "quick charge in progress" in a case in which all the USB authentication and the WPT authentication succeed and display "slow charge in progress" or "charge in progress" in a case in which one of the USB authentication and the WPT authentication fails. The control unit 201 may control the display unit 202 so as to perform another display capable of discriminating between the display in the case in which the USB authentication and the WPT authentication succeed and the display in a case in which at least one of the USB authentication and the WPT authentication fails. This allows the user of the TX 100 or the RX 200 to know how the results of USB authentication and WPT authentication are reflected on the charge power (charge speed), and also makes it possible to improve the convenience.

Additionally, when the reception power is limited, the control unit 201 can recognize the reason in advance because the GP decided based on the USB authentication result received in 410, the WPT authentication processing 410, and the settings as shown in FIG. 6 is requested. For this reason, when the reception power is limited, the control unit 201 may display a message representing that the reception power is limited on the display unit 202 together with the reason. The control unit 201 may control the display unit 202 so as to display, for example, "slow charge in progress because of the problem of the USB device connected to the power transmitter", "slow charge in progress because of the problem of the charger (TX 100)", or the like. This allows the user of the TX 100 or the RX 200 to know how the results of USB authentication and WPT authentication are reflected on the charge power (charge speed), and the reason in a case in which the charge power is limited. The convenience can further be improved so that in a case in which, for example, a message representing that the charge power is limited because of the charger is displayed, the user can cancel the limitation of the charge power by exchanging the charger. In addition, display to propose a measure to cancel the limitation to the user may be performed. For example, the control unit 201 may control the display unit 202 so as to display "for quick charge, please exchange the USB cable of the charger", "for quick charge, please exchange the charger (TX 100)", or the like. In addition, the control unit 201 may display the USB authentication result and the WPT authentication result on the display unit 202. For example, "authentication for the USB cable connected to the charger (TX 100) has failed", "authentication for the charger (TX 100) has failed", or the like may be displayed.

In addition, if the USB authentication and the WPT authentication are authentication processing based on a digital certificate, as will be described later, the certificate of the charger cannot be obtained, the certificate of the USB cable is inauthentic, or the like may be displayed. This display allows the user of the TX 100 or the RX 200 to know the result of USB authentication and WPT authentication and thus determine whether the charge power (charge speed) is limited or not. Also, the convenience can further be improved so that the user can cancel the limitation of the charge power by exchanging the USB cable or the like.

In addition, one of the four pieces of information, that is, the USB authentication result (of each USB device), the WPT authentication result, the charge power, and an action to increase the charge power, or a combination of some of them may be displayed. The user recognizes, by this display, that the power is limited, thereby recognizing that the charge takes a longer time as compared to a case in which the power is not limited and taking an action of, for example, exchanging the USB cable or the AC adapter with a product compliant with USB authentication. This display may be done by changing the LED color or flashing pattern between a case in which the power is not limited and a case in which the power is limited. Alternatively, the information may be presented to the user by generation different sound or vibration between a case in which the power is not limited and a case in which the power is limited.

In this embodiment, after it is determined in USB authentication whether to limit the transmission power, the power transmission apparatus of WPC is activated. However, the present disclosure is not limited to this. For example, the power transmission apparatus of WPC may be activated before USB authentication is completed. For example, the system may cope with a case in which USB authentication is completed after the TX 100 starts power transmission in the PT phase by WPT authentication. In this case, if it is found that the transmission power should be limited by USB authentication after the TX 100 starts power transmission in the PT phase by WPT authentication, the negotiation may be executed again to limit the transmission power. For example, when the USB authentication ends, the TX 100 can request the negotiation again of the RX 200. Note that at this time, the TX 100 decides the allowable maximum value of the GP based on the result of USB authentication and the settings as shown in FIG. 6. In addition, the RX 200 may periodically obtain Auth complete bit to be described later from the TX 100 and request execution of negotiation. In this case, when the Auth complete bit changes to "1" representing the end of USB authentication, the RX 200 requests the negotiation again of the TX 100. According to this arrangement, it is possible to immediately start charge after the activation of the system.

On the other hand, according to activating the power transmission apparatus of WPC (executing WPT authentication) after determining whether to limit the transmission power in USB authentication, as described above, the number of times of negotiation can be one. In this case, since it is already decided whether to limit the transmission power by USB authentication when the TX 100 deices the GP in the negotiation phase (415), the negotiation need not be executed after that.

Here, details of the USB authentication result transmitted from the TX 100 to the RX 200 in 410 of FIG. 4 will be described. The USB authentication result is data representing the result of USB authentication (401) of the TX 100, and in one example, is transmitted by a Power Transmitter Capability Packet of the WPC standard v1.2.2 as shown in FIG. 10B. For example, in the packet structure shown in FIG. 10B, at least either of bit7 and bit6 (1010) in Bank1 and bit7 to bit2 (1011) in Bank2, which are "Reserved", is used to transmit the USB authentication result. The TX 100 stores at least one of "whether a function of notifying the USB authentication result is provided", "whether USB authentication is completed", and "the result of USB authentication" in these bits and transmits the bits.

Here, each information is defined as follows.

USB Auth bit: a bit representing "whether a function of notifying the USB authentication result is provided" and "whether the TX 100 is compliant with USB authentication". When the USB Auth bit is "1", it represents that the first authentication unit 108 of the TX 100 has the USB authentication function. If "0", it represents that the first authentication unit 108 of the TX 100 does not have the USB authentication function.

Auth completion bit: a bit representing whether USB authentication of the USB cable 300 and the AC adapter 301 has ended. When the USB complete bit is "1", it represents that the first authentication unit 108 of the TX 100 has executed and ended USB authentication processing for the USB cable 300 and the AC adapter 301. If "0", it represents that the USB authentication processing has not ended.

USB Auth Result bit: a bit representing the USB authentication result for the USB cable 300 and the AC adapter 301. If the USB Auth Result bit is "1", it represents that the first authentication unit 108 of the TX 100 has successfully executed USB authentication processing for the USB cable 300 and the AC adapter 301, and the authenticity of the USB cable 300 and the AC adapter 301 is confirmed. If the USB Auth Result bit is "0", it represents that the USB authentication processing has not succeeded.

Note that to receive the Power Transmitter Capability Packet storing the USB authentication result, the RX 200 transmits a packet to request the USB authentication result in 409 of FIG. 4. In one example, this packet is a General Request packet defined by the WPC standard v1.2.2. For example, of the General Request, the RX 200 transmits a message to request the Power Transmitter Capability Packet. In addition, the TX 100 may expand the Power Transmitter Identification Packet of the WPC standard v1.2.2 and transmit the USB authentication result. In this case, of the General Request, the RX 200 transmits a message to request the Power Transmitter Identification Packet. Alternatively, of the General Requests defined by WPC standard v1.2.2, a Reserved Packet or Proprietary Packet whose Packet type is undefined may be defined as the USB authentication result request packet.

If it is possible to respond to the USB authentication result request, the TX 100 transmits, to the RX 200, a packet including at least one of the USB Auth bit, the USB Auth completion bit, and the USB Auth Result bit. If it is not possible to cope with the USB authentication result request, the TX 100 transmits, to the RX 200, a Power Transmitter Data Not Available Packet representing that the TX cannot cope with the request. Upon receiving the Power Transmitter Data Not Available Packet, the RX 200 considers that the TX 100 does not have the function of notifying the RX 200 of the USB authentication result. Then, the RX 200 determines that the TX 100, the USB cable 300, or the AC adapter 301 is not compliant with the USB authentication.

In addition, of Specific Requests defined by WPC standard v1.2.2, a Reserved Packet or Proprietary Packet whose Packet type is undefined may be defined as the USB authentication result request. At this time, if it is possible to respond to the USB authentication result request, the TX 100 transmits, to the RX 200, a packet including at least one of the USB Auth bit, the USB Auth completion bit, and the USB Auth Result bit. On the other hand, if it is not possible to cope with the USB authentication result request, the TX 100 transmits, to the RX 200, a Not-Defined Response (ND Resp) Packet representing that the TX cannot cope with the request. Upon receiving the ND Resp Packet, the RX 200 considers that the TX 100 does not have the function of notifying the RX 200 of the USB authentication result. Then, the RX 200 determines that the TX 100, the USB cable 300, or the AC adapter 301 is not compliant with the USB authentication.

In addition, of the packets of the WPC standard v1.2.2, a packet other than the Specific Request or General Request may be used for the USB authentication request. For example, a Reserved Packet or Proprietary Packet whose Packet type is undefined, unlike the Specific Request or General Request, can be defined as the USB authentication request. At this time, if it is not possible to cope with the USB authentication result request, the TX 100 transmits a Not-Defined Response (ND Resp) Packet representing that the TX cannot cope with the request. Upon receiving the ND Resp Packet, the RX 200 considers that the TX 100 does not have the function of notifying the RX 200 of the USB authentication result. Then, the RX 200 determines that the TX 100, the USB cable 300, or the AC adapter 301 is not compliant with the USB authentication.

In addition, the USB authentication result may include the identification information of the device to perform USB authentication and the result. For example, a bit representing whether the USB cable 300 is compliant with USB authentication can be defined as "USB Auth bit1". Similarly, a bit representing whether the USB authentication for the USB cable 300 has ended and a bit representing that the USB authentication result for the USB cable 300 can be defined as "USB Auth completion bit1" and "USB Auth Result bit1", respectively. Also, a bit representing whether the AC adapter 301 is compliant with USB authentication can be defined as "USB Auth bit2". Similarly, a bit representing whether the USB authentication for the AC adapter 301 has ended and a bit representing that the USB authentication result for the AC adapter 301 can be defined as "USB Auth completion bit2" and "USB Auth Result bit2", respectively. In this way, for each of the USB cable 300 and the AC adapter 301, the TX 100 may notify the RX 200 of at least one of whether the device is compliant with USB authentication, whether the USB authentication has ended, and the result of USB authentication. Accordingly, the RX 200 can determine whether the cause of the limitation of the GP exists in the USB cable 300 or the AC adapter 301 and can cause the display unit 202 to perform display the proposal of a measure to the user, as described above.

The RX 200 may decide, based on the attribute of the TX 100, whether to transmit the USB authentication result request. For example, to determine whether the TX 100 has the function of transmitting the USB authentication result to the RX 200, the RX 200 requests the above-described Power Transmitter Capability Packet and receives it from the TX 100. If the USB Auth bit is "1", the RX 200 can transmit the USB authentication request using the above-described Reserved Packet or Proprietary Packet. If the USB Auth bit is "0", the RX 200 does not transmit the USB authentication request and can determine that the device is noncompliant with USB authentication.

In addition, the RX 200 may decide, based on the Power Transmitter Identification Packet, whether to transmit the USB authentication result request. For example, to determine whether the TX 100 has the function of transmitting the USB authentication result to the RX 200, the RX 200 requests the Power Transmitter Identification Packet and receives it from the TX 100. Based on one of standard version information and a Manufacture code representing the manufacturer of the TX 100, which are included in the Power Transmitter Identification Packet, the RX 200 can determine whether to transmit the USB authentication result request. For example, if both the standard version of the self-apparatus and that of the TX 100 are equal to or more than a specific version, the RX 200 determines that the TX 100 can respond to the USB authentication result request and decides to transmit the USB authentication result request. Otherwise, the RX 200 decides not to transmit the USB authentication result request. In addition, if both the standard version of the self-apparatus and that of the TX 100 are equal to or more than a specific version, and the Manufacture code of the TX 100 equals the value of the self-apparatus, the RX 200 can determine that the TX 100 can respond to the USB authentication result request. In this case, the RX 200 decides to transmit the USB authentication result request to the TX 100. Otherwise, the RX 200 can determine that the TX 100 cannot respond to the USB authentication result request, and decide not to transmit the USB authentication result request.

<Operation of WPT Authentication and Backward Compatibility>

When transmitting a larger power in accordance with the WPC standard, the rule of the WPT authentication function to avoid a problem such as excessive heating needs to be added to the conventional WPC standard, as described above. It is important here that a TX having the WPT authentication function can be compliant with an RX having the same WPT authentication function and can also ensure backward compatibility with a legacy RX. Similarly, it is important here that an RX having the WPT authentication function can ensure backward compatibility with a legacy TX. However, there is not known a method that adds the WPT authentication function and considers backward compatibility while complying with the legacy WPC standard.

Figure 7:
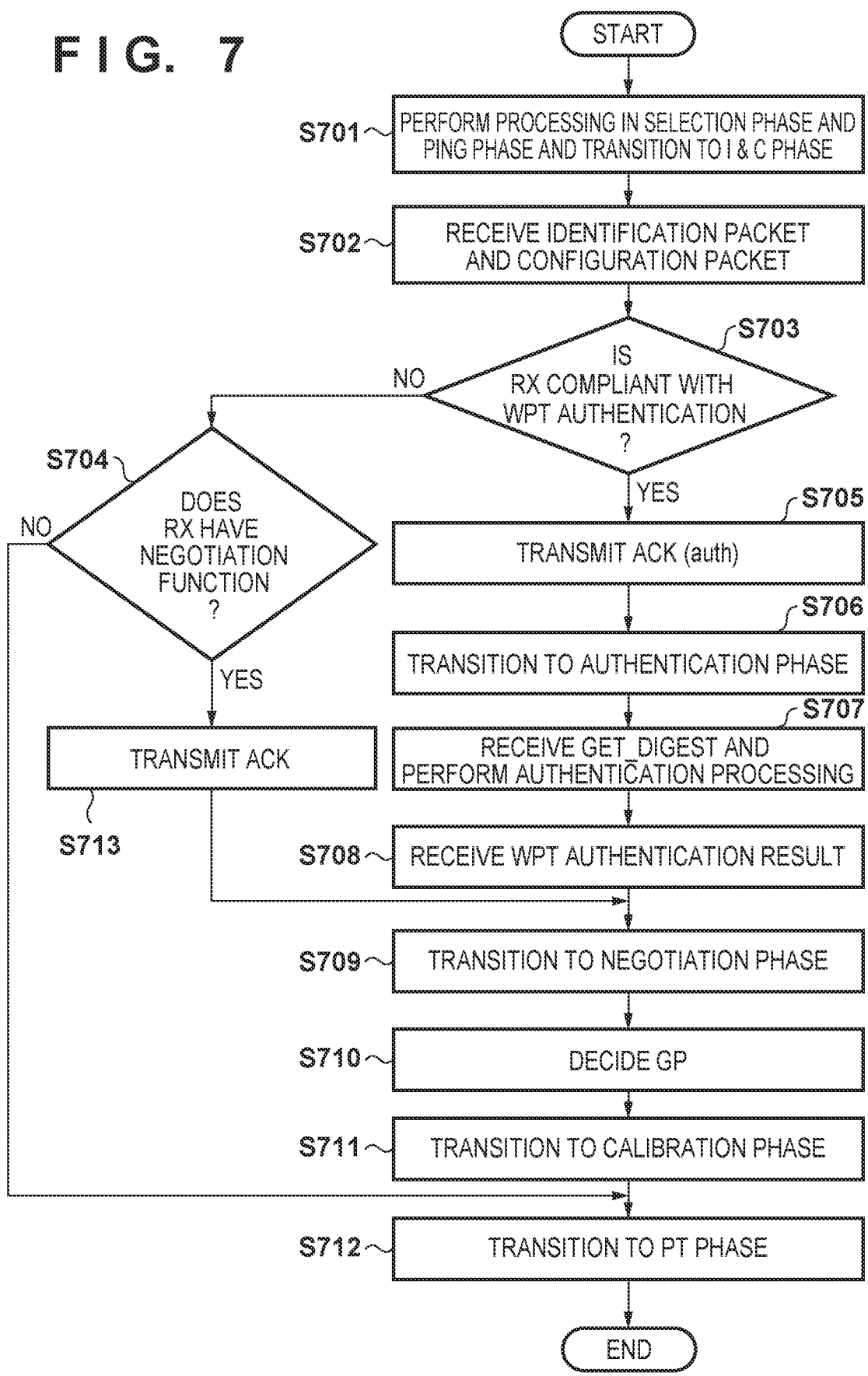
FIG. 7 is a flowchart showing state transition up to power transmission by the control unit of the power transmission apparatus.
Figure 8A:
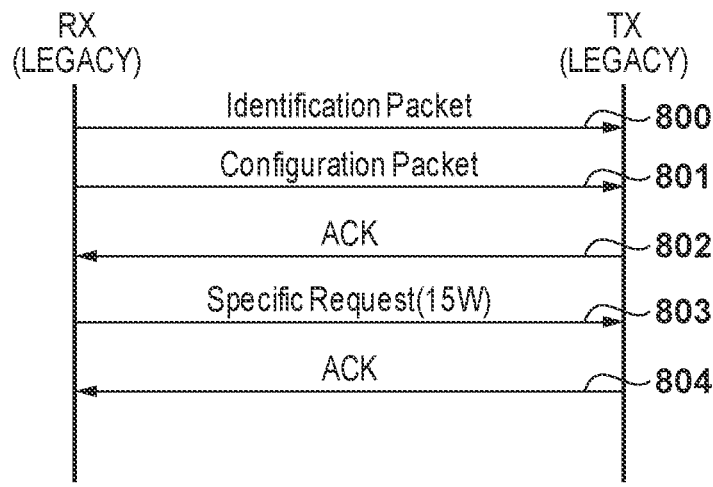
FIGS. 8A to 8E are sequence charts concerning communication between the power transmission apparatus and the power receiving apparatus.
Figure 8B:
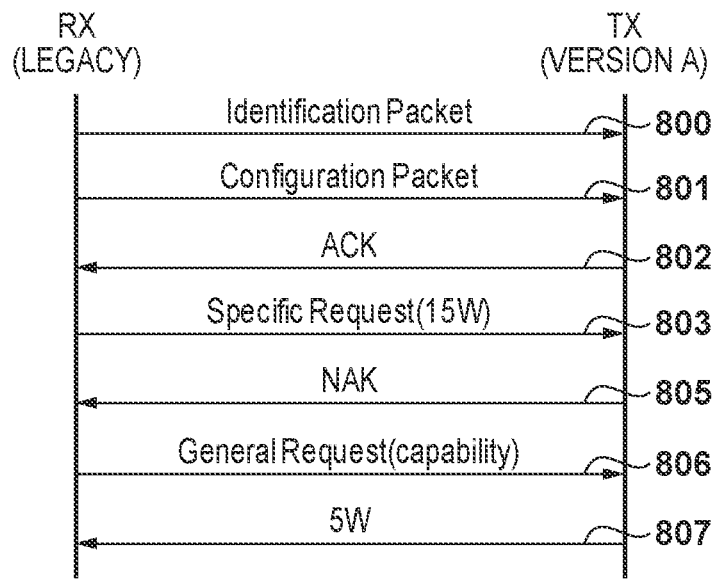
Figure 8C:
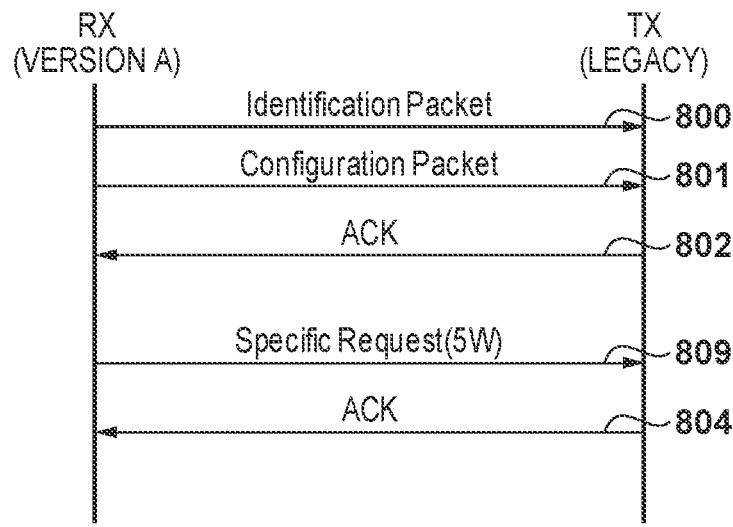
Figure 8D:
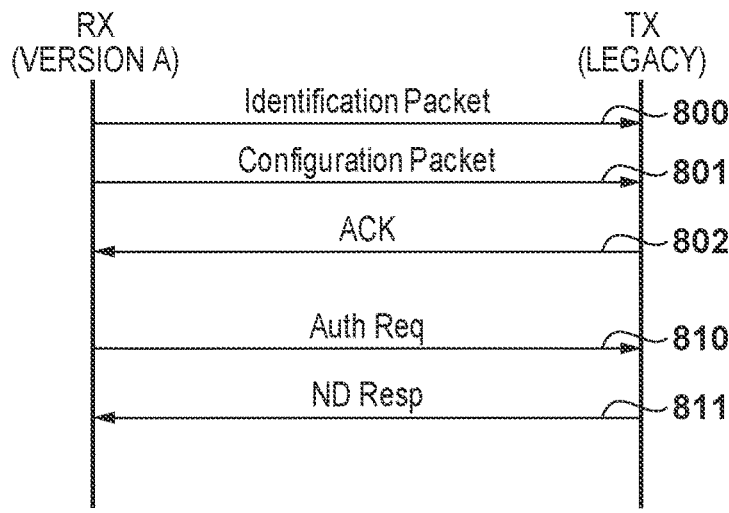

FIG. 7 shows an example of the procedure of processing of the control unit 101 of the TX 100 according to this embodiment. FIGS. 8A to 8E are sequence charts for explaining backward compatibility by the TX 100 or RX 200 of the version A. Note that a description will be made below assuming that the WPT authentication is challenge-response type device authentication using a digital certificate, like the USB authentication. However, the present disclosure is not limited to this. Here, the RX 200 operates as an initiator that transmits a challenge text to the TX 100, and the TX 100 operates as a responder that encrypts the challenge text and transmits it to the RX 200. FIGS. 9A to 9C are flowcharts showing the procedure of processing of the control unit 201 of the RX 200. FIG. 10A is a view showing an example of the bit structure of a Configuration Packet according to the WPC standard. FIG. 10B is a view showing an example of the bit structure of a Power Transmitter Capability Packet according to the WPC standard. Note that the same step members denote the same processes in the drawings.

The categories of TXs and RXs based on the WPC standard v1.2.2 will be described before the explanation of the procedure of each processing. TXs and RXs with a GP of 5 W are categorized into Basic Power Profile (BPP). TXs and RXs with a GP more than 5 W and not more than 15 W are categorized into Extended Power Profile (EPP). Furthermore, in the WPC standard v1.2.2, the function of performing a negotiation between the TX and the RX concerning the GP is added, and the TX and the RX categorized into EPP have the negotiation function. The TXs and the RXs categorized into BPP are further categorized into devices that are compliant with the negotiation function and devices that are not. A TX can determine whether an RX has the negotiation function or not, based on the value of a Neg bit (Bank4, bit7) in the Configuration Packet (FIG. 10A) in which the setting information of the RX is described. When the Neg bit is "1", it represents that the RX has the negotiation function. When the Neg bit is "0", it represents that the RX does not have the negotiation function. In this embodiment, legacy TXs and RXs have the negotiation function, and the negotiation is executed in the negotiation phase, unless otherwise specified.

It is important that TXs and RXs of the WPC standard version A compliant with WPT authentication ensure backward compatibility with legacy RXs and TXs compliant with the WPC standard v1.2.2, respectively. That is, it is important that a TX compliant with the WPC standard version A operates even for an RX compliant with the WPC standard before the version A without inconsistency, and an RX compliant with the version A operates even for a TX compliant with the WPC standard before the version A without inconsistency.

The TX 100 and the RX 200 compliant with the version A according to this embodiment have backward compatibility with the WPC standard v1.2.2, and this will be described with reference to FIGS. 7, 8A to 8E, and 9A to 9C. A TX and an RX compliant with legacy EPP of the WPC standard v1.2.2 cause state transition in the order of the selection phase, the Ping phase, the I & C phase, the negotiation phase, the calibration phase, and the PT phase. If at least one of the legacy TX and RX is a device of BPP which does not have the negotiation function, the TX and the RX transition to the selection phase, the Ping phase, and the I & C phase and then cause state transition to the PT phase. As described above, if both the TX and the RX are compliant with the authentication phase, the TX and the RX transition to the authentication phase after the selection phase, the Ping phase, and the I & C phase. Then, after the authentication phase, the TX and the RX cause transition in the order to the negotiation phase, the calibration phase, and the PT phase.

The authentication phase is executed before, for example, the negotiation phase. This is because the value of the GP changes depending on the result of WPT authentication, as described with reference to FIG. 6. If the TX and the RX decide the GP in the negotiation phase and then transition to the authentication phase, the already decided GP may be reset in accordance with the result of the authentication phase. That is, after the GP is decided, it may be necessary to do a change to lower the GP to avoid excessive heating or the like depending on the result of WPT authentication. When such re-change of the GP is performed, the procedure until transition to the PT phase may become cumbersome, or the time needed for the procedure may become long. On the other hand, when the authentication phase is executed before the negotiation phase, the GP can be decided in the negotiation phase based on the GP limited in the authentication phase. When the GP is limited in the authentication phase before the negotiation phase in this way, it is possible to quickly transition to the PT phase without causing reset of the GP until the transition to the PT phase.

[Processing in Case in which Both TX 100 and RX 200 are Legacy]

An example of processing in the WPC standard v1.2.2 in a case in which both the TX 100 and the RX 200 are compliant with the legacy EPP will be described first with reference to FIG. 8A. Note that in the following explanation, USB authentication by the TX 100 for the USB cable 300 and the AC adapter 301 is assumed to succeed. In this processing example, only portions concerning legacy EPP are used in the flowcharts of FIGS. 7 and 9A. That is, in the legacy TX, the processes of steps S703 to S708 in FIG. 7 are not executed. In the legacy RX, the processes of steps S903 to S905 and S908 in FIG. 9A are not executed. Note that FIG. 8A shows only the sequence after the I & C phase, which is associated with backward compatibility.

Transition to the I & C phase occurs after processing in the selection phase and the Ping phase between the TX 100 and the RX 200 (step S901). In the I & C phase, the RX 200 transmits an Identification Packet (ID packet) to the TX 100 (step S702), and the TX 100 receives this (800, step S702). In addition to the individual identification information of the transmission source apparatus (RX 200), an information element that specifies the version (in this case, "1.2.2") of the compliant WPC standard is stored in the ID packet. Next, the RX 200 transmits a Configuration Packet to the TX 100 (step S901), and the TX 100 receives this (801, step S702). The Configuration Packet of the WPC standard v1.2.2 includes a Maximum Power Value that specifies the maximum power that the RX 200 can supply to the load, and a Neg bit representing whether the RX 200 has the negotiation function or not. Here, the RX 200 transmits a Configuration Packet in which the Neg bit is set to "1" representing that the RX 200 has the negotiation function.

Upon receiving the ID packet and the Configuration Packet from the RX 200, the TX 100 determines whether the RX 200 has the negotiation function (step S704). Note that the legacy TX 100 does not execute the process of step S703, as described above. Here since the RX 200 ha the negotiation function (YES in step S704), the TX 100 transmits an ACK to the Configuration Packet (step S713. 802) and transitions to the negotiation phase (step S709). Note that if the RX 200 is BPP (the Neg bit is 0) that is not compliant with negotiation (NO in step S704), the TX 100 transitions to the PT phase without transmitting an ACK (step S712). In a case in which the TX 100 itself is BPP and is not compliant with negotiation as well, the TX 100 transitions to the PT phase without transmitting an ACK. Note that in this case, the GP is limited to 5 W.

The RX 200 waits for reception of an ACK to the Configuration Packet (step S902). Upon receiving the ACK (YES in step S902), the RX 200 determines that the TX 100 is compliant with the negotiation function, and transitions to the negotiation phase (step S906). Note that the process of step S908 is not executed here, as described above. The RX 200 then transmits a Specific Request packet that requests a power (for example, 15 W) necessary for the self-apparatus. In this case, the RX 200 transmits, to the TX 100, a Specific Request packet (Specific Request (15 W)) including an information element representing that the RX requests 15 W as the GP (803). Here, if the ACK is not received in 15 ms from the Configuration Packet transmission (NO in step S902), the RX 200 of the WPC Standard v1.2.2 determines that the TX 100 is BPP that does not have the negotiation function (step S909). Then, the RX 200 causes state transition to the PT phase (step S910).

Upon receiving the Specific Request (15 W), the TX 100 compares the power transmission capability of the self-apparatus with the requested power amount (15 W), and if it can transmit the requested power amount, transmits an acknowledge (ACK) to the RX 200. On the other hand, if it is impossible to transmit the requested power amount, the TX 100 transmits a negative acknowledge (NAK) to the RX 200. Here, the TX 100 determines that it can transmit a power of 15 W, decides the GP to 15 W (step S710), and transmits an ACK (804). Then, the TX 100 transitions to the calibration phase (step S711). Upon receiving the ACK from the TX 100 in response to the Specific Request transmitted in 803, the RX 200 causes state transition to the calibration phase (step S907). In the calibration phase, the TX 100 performs adjustment based on the correlation between a value measured inside the TX 100 for the power transmitted by the TX 100 to the RX 200 and the value of the reception power measured inside the RX 200. When the calibration phase ends, the TX 100 and the RX 200 transition to the PT phase and start contactless power transmission (steps S712 and S910).

As described above, the TX 100 of the WPC standard v1.2.2 determines, based on the Neg bit, whether the RX 200 is EPP or BPP having the negotiation function or BPP that does not have the negotiation function. If the RX 200 is EPP or BPP having the negotiation function, the TX 100 causes state transition to the negotiation phase, executes a negotiation concerning the transmission power, and then starts power transmission. On the other hand, if the RX 200 is BPP that does not have the negotiation function, the TX 100 transitions not to the negotiation phase but to the PT phase and executes transmission of a relatively low power. In addition, if the ACK is received in 15 ms from the transmission of the Configuration Packet, the RX 200 of the WPC standard v1.2.2 transitions to the negotiation phase. If the ACK is not received, the RX 200 transitions to the PT phase. With the above-described operation, in the WPC standard v1.2.2, the compatibility between the TX 100 and the RX 200 having the negotiation function and the TX 100 and the RX 200 that do not have the function is ensured.

[Processing in Case in which TX 100 is Version a and RX 200 is Legacy]

An example of processing in a case in which the TX 100 is compliant with the version A, and the RX 200 is legacy will be described next with reference to FIGS. 8B, 6, 7, and 9A. Note that in the following explanation, USB authentication by the TX 100 for the USB cable 300 and the AC adapter 301 is assumed to succeed. Note that since the following description is wholly a description concerning the backward compatibility of the WPC standard, the following argument is applicable even if the TX 100 does not include the first authentication unit 108.

First, before the description of the procedure of processing, an Auth bit in the Configuration Packet will be defined. FIG. 10A is a view showing the structure of the Configuration Packet of the WPC standard v1.2.2. Note that a description of portions that are not associated with the description in this embodiment will be omitted. The Configuration Packet includes a plurality of Reversed fields. Examples are a Reversed field 1001 from bit4 to bit6 of Bank2, a Reversed field 1000 from bit0 to bit7 of Bank1, and a Reversed field 1002 from bit2 to bit0 of Bank4. In this embodiment, the Auth bit is arranged in bit6 of Bank2. However, the arrangement of the Auth bit is not limited to this, and the Auth bit may be arranged in another Reversed field. Note that in the WPC standard v1.2.2, all the bits in the Reversed field are 0. The RX 200 stores "1" in the Auth bit when the self-apparatus is compliant with WPT authentication, and stores "0" when the self-apparatus is not compliant with WPT authentication. Note that since the position to store the Auth bit is a Reversed bit, even an RX compliant with the standard of an old generation that does not recognize that the Auth bit is stored at this position can store "0" as the value at this position.

The TX 100 determines, based on the Auth bit in the Configuration Packet, whether the RX 200 is compliant with WPT authentication (step S703). In this processing example, since the RX 200 is legacy, the Auth bit is "0". The TX 100 determines that the RX 200 is not compliant with WPT authentication (NO in step S703), and transitions to the negotiation phase. Here, if a request of a GP of 15 W is received from the RX 200, the TX 100 transmits, to the RX 200, an NAK to reject the request (805). This is because since the RX 200 is noncompliant with WPT authentication, the TX 100 determines that a power of 15 W should not be transmitted to avoid a problem such as excessive heating in the RX 200.

Since the request is rejected by the NAK, the RX 200 transmits a General Request defined by the WPC standard v1.2.2 to know the value of the GP that the TX 100 can set. In this embodiment, of the General Request, a message to request a Transmitter Capability Packet is expressed as General Request (capability). Upon receiving the General Request (capability) (806), the TX 100 decides 5 W corresponding to WPT authentication noncompliant (row 603) and USB authentication success (column 602) as the allowable maximum value of the GP based on the settings in FIG. 6. Then, the TX 100 stores information representing 5 W in the Guaranteed Power Value in the Power Transmitter Capability Packet and transmits it to the RX 200 (807). Note that the Transmitter Capability Packet is a packet including the information of the maximum value of the GP allowable in negotiation and defined by the WPC standard v1.2.2.

As described above, by the Auth bit defined in this embodiment, the TX 100 compliant with the WPC standard version A can operate even for the legacy RX compliant with the WPC standard before the version A without inconsistency.

[Processing in Case in which Both TX 100 and RX 200 are Version A]

A case in which both the TX 100 and the RX 200 are compliant with WPT authentication processing will be described next with reference to FIGS. 6, 7, 8E, and 9A. Note that in the following explanation, USB authentication by the TX 100 for the USB cable 300 and the AC adapter 301 is assumed to succeed. Before the description of the procedure of processing, the operations of the TX 100 and the RX 200 of the version A, which are compliant with WPT authentication, will be described.

The RX 200 of the version A transmits a Configuration Packet with an Auth bit storing "1" to the TX 100. Upon determining that the RX 200 is compliant with WPT authentication by the Auth bit of the Configuration Packet (YES in step S703), the TX 100 of the version A transmits an ACK (auth) to the RX 200 (step S705, 802). The ACK (auth) is an acknowledge formed by a bit pattern different from an ACK so as to be distinguishable from the ACK, and is a packet representing that the TX 100 is compliant with WPT authentication. Upon specifying that the RX 200 is compliant with WPT authentication, the TX 100 transmits an ACK (auth) and transitions to the negotiation phase (step S706). On the other hand, upon receiving not an ACK but an ACK (auth) (NO in step S902, YES in step S903), the RX 200 determines that the TX 100 is compliant with WPT authentication (step S904). Then, the TX 100 transitions to the negotiation phase (step S905).

Figure 8E:
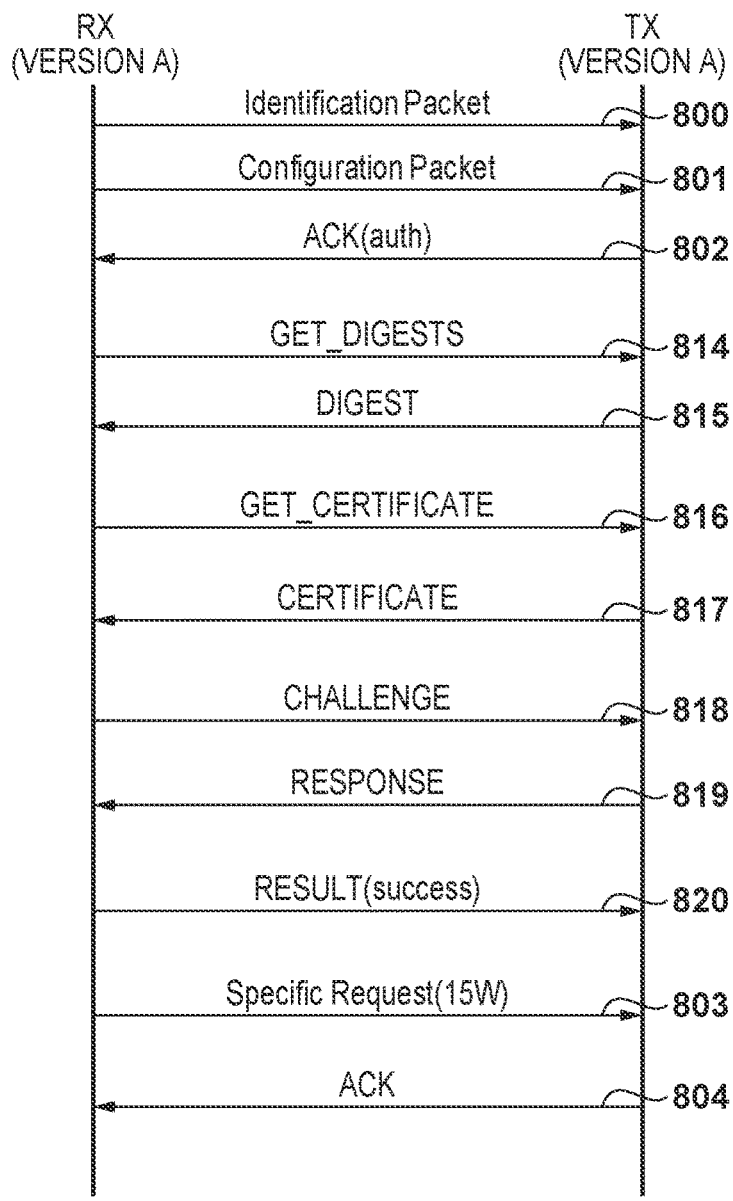
Figure 9A:
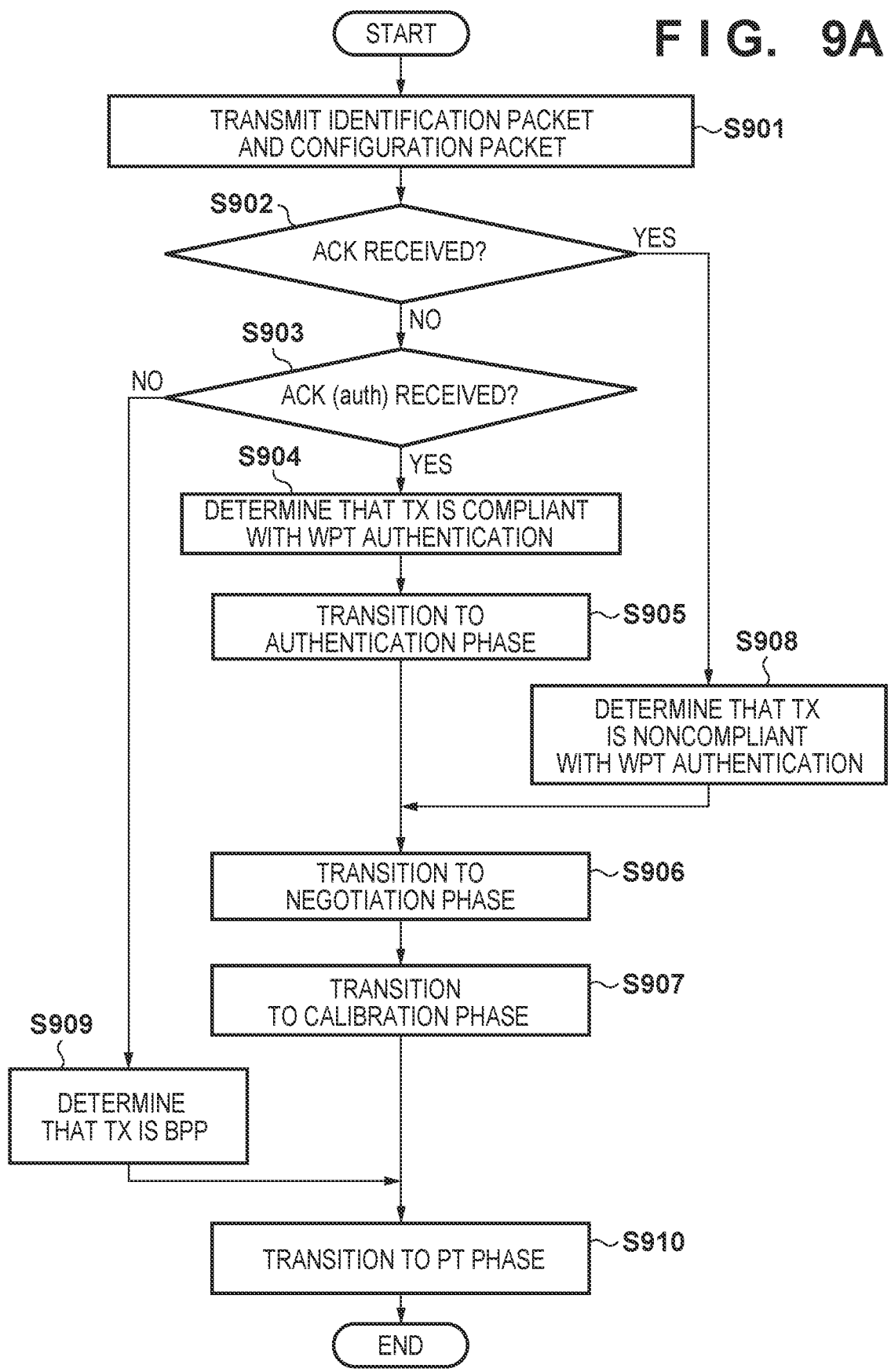
FIGS. 9A to 9C are flowcharts showing state transition up to power transmission by the control unit of the power receiving apparatus.
Figure 9B:
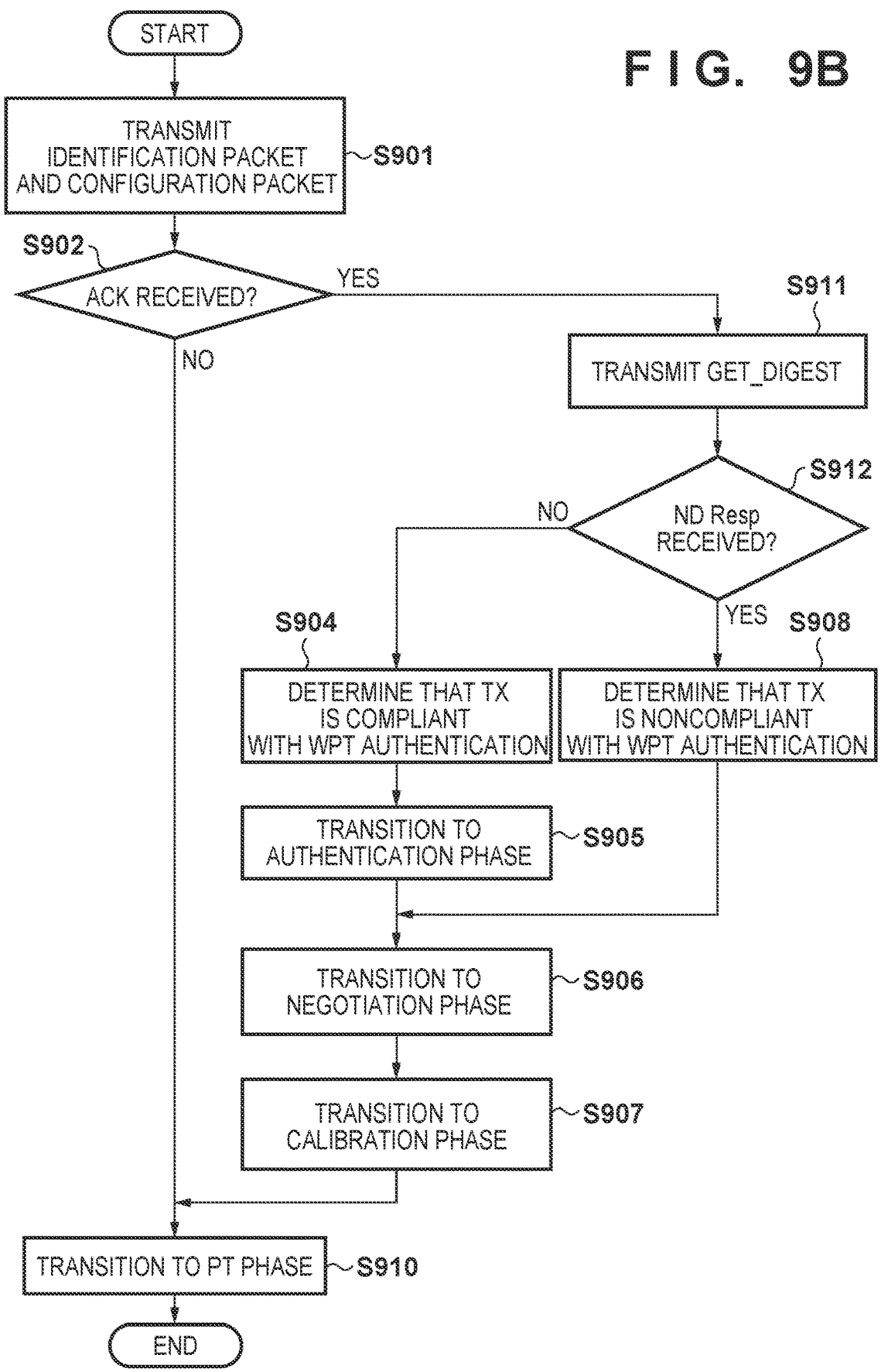
Figure 9C:
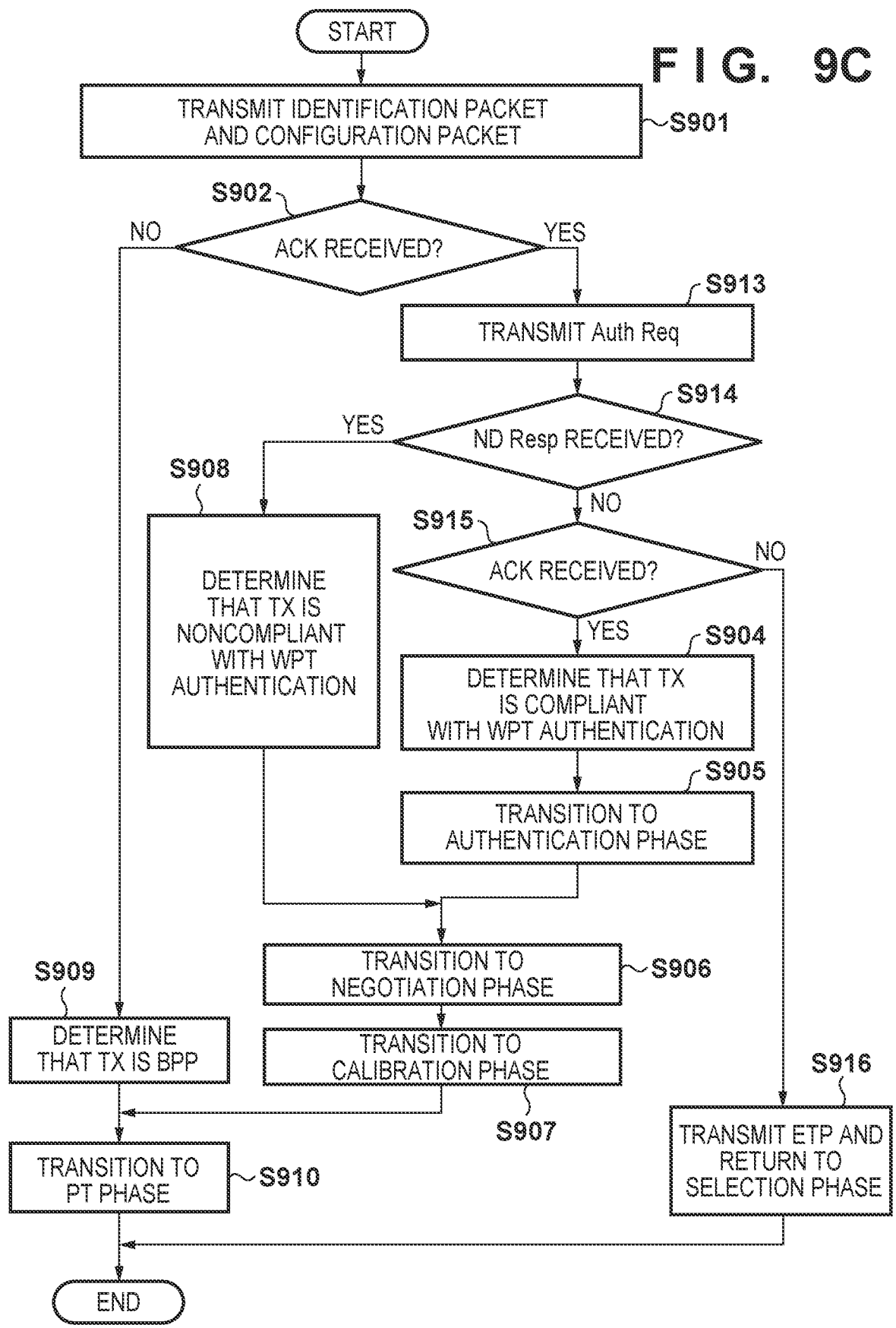

An example of WPT authentication according to this processing example is shown in 814 to 820 in FIG. 8E. First, the RX 200 transmits a GET_DIGEST message, and the TX 100 receives this (814, step S707). The GET_DIGEST packet is a Packet that requests information concerning the digital certificate held by the TX 100. The TX 100 transmits a DIGEST in response to the GET_DIGEST Packet (815). The DIGEST is information concerning the digital certificate held by the TX 100. Next, the RX 200 transmits, to the TX 100, a GET_CERTIFICATE Packet that requests detailed information concerning the digital certificate (816). The TX 100 transmits a CERTIFICATE to the RX 200 in response to the GET_CERTIFICATE Packet (817). Next, the RX 200 transmits a CHALLENGE message including a challenge text to the TX 100 (818), and the TX 100 transmits a response obtained by encrypting the challenge text to the RX 200 (819). Upon confirming the authenticity of the RESPONSE, the RX 200 transmits a RESULT (success) to the TX 100, and the TX 100 receives this (820, step S708). Then, the TX 100 transitions to the negotiation phase (step S709). The RESULT (success) packet means that WPT authentication succeeds as the result of the RESPONSE. If WPT authentication fails as the result of the RESPONSE, the RX 200 transmits a RESULT (fail) to the TX 100. Note that the RESULT (success or fail) has the same meaning as the WPT authentication result described concerning step S412 in FIG. 4.

Upon receiving the RESULT (success), the TX 100 transitions to the negotiation phase. In addition, the TX 100 may transition to the negotiation phase after transmitting an ACK (not shown) to the RESULT (success). After transmitting the RESULT (success), the RX 200 transitions to the negotiation phase (step S906). Here, the RX 200 may transition to the negotiation phase after receiving an ACK (not shown) to the RESULT (success). In the negotiation phase, the TX 100 decides 15 W corresponding to WPT authentication success (row 605) and USB authentication success (column 602) as the allowable maximum value of the GP based on the settings in FIG. 6, and performs a negotiation. Here, in this processing example, assume that the TX 100 is requested 15 W as the GP from the RX 200 (803). At this time, since the allowable maximum value of the GP is 15 W, as described above, the TX 100 transmits an ACK to the RX 200 to acknowledge the request (804).

Note that if authentication based on the received RESPONSE fails, the RX 200 transmits a RESULT (fail) representing that the authentication fails to the TX 100. In this case, the TX 100 decides the value of the GP in the negotiation phase based on the settings as shown in FIG. 6. In addition, upon receiving the RESULT (fail), the TX 100 may stop the power transmission unit 103 to inhibit power transmission.

As described above, the RX 200 according to this embodiment can operate without inconsistency not only for a TX compliant with the WPC standard before the version A but also for a TX compliant with the version A.

The time interval between the packets from the GET_DIGESTS in 814 to the RESULT (success) in 820 will be described here. As for the response of the RX 200 to a packet from the TX 100, for example, in the negotiation phase of the WPC standard v1.2.2, the time from the trailing end of a packet of the TX 100 to the leading end of a packet to be transmitted from the RX 200 next is defined as 10 ms or less. However, the initiator (RX 200) of the authentication phase needs to execute processing of confirming the authenticity of packets (DIGEST, CERTIFICATE, and RESPONSE) concerning the digital certificate, which are transmitted from the TX 100. For this reason, the RX 200 needs time for processing of confirming the authenticity for the response of the TX 100. Hence, in the authentication phase, a time longer than the time defined in other phases as a time from the reception of a packet from the TX 100 to the transmission of a next packet by the RX 200 is provided. In this embodiment, this time is set to 50 ms. In FIG. 8E, this time is set as the time from DIGEST to GET_CERTIFICATE, from CERTIFICATE to CHALLENGE, and from RESPONSE to RESULT (success). When this time is made long, the necessity that the control unit 201 of the RX 200 operates at a high speed is lower, and reduction of power consumption of the control unit 201 and cost reduction by the use of a low-speed CPU can be implemented.

The responder (TX 100) of the authentication phase also needs to execute processing of responding to packets (GET_DIGEST, GET_CERTIFICATE, and CHALLENGE) concerning the digital certificate, which are transmitted from the RX 200. For this reason, time is needed for the response in the authentication phase. Hence, in the authentication phase, a response time longer than the response time in other phases may be provided. When the response time is made long, the necessity that the control unit 101 of the TX 100 operates at a high speed lowers, and reduction of power consumption of the control unit 101 and cost reduction by the use of a low-speed CPU can be implemented.

Note that in the above description, the TX 100 determines, based on the Auth bit of the Configuration Packet, whether the RX 200 is compliant with WPT authentication. However, this determination may be done based on the version information of the ID packet. For example, if the version information of the RX 200 represents the version A (or a later version), the TX 100 determines that the RX 200 is compliant with WPT authentication. If the version information represents a version before the version A, the TX 100 determines that the RX 200 is not compliant with WPT authentication.

Note that of Specific Requests of the WPC standard v1.2.2, a Reserved Packet or Proprietary Packet whose Packet type is undefined may be defined as a packet associated with the digital certificate. In addition, of General Requests of the WPC standard v1.2.2, a Reserved Packet or Proprietary Packet whose Packet type is undefined may be defined as a packet associated with the digital certificate. Also, of packets of the WPC standard v1.2.2, a packet other than the Specific Request or General Request may be defined as a packet associated with the digital certificate. For example, unlike the Specific Request or General Request, a Reserved Packet or Proprietary Packet whose Packet type is undefined can be defined as a packet associated with the digital certificate. The packets associated with the digital certificate include a GET_DIGEST, GET_CERTIFICATE, and CHALLENGE packets, as described above.

[Processing in Case in which TX is Legacy and RX is Version A]

An example of processing in a case in which the TX 100 is legacy, and the RX 200 is compliant with the version A will be described next with reference to FIGS. 8C, 6, and 9A. Note that in the following explanation, USB authentication by the TX 100 for the USB cable 300 and the AC adapter 301 is assumed to succeed.

The operation of the RX 200 compliant with the version A will be described first. The RX 200 notifies the TX 100, by a Configuration Packet, that the self-apparatus is compliant with WPT authentication (800, 801, step S901). In this case, however, since the TX 100 is legacy, the Auth bit is ignored. Since the RX 200 is compliant with the negotiation function, the TX 100 transmits an ACK and transitions to the negotiation phase (YES in step S704, steps S713 and S709).

Upon receiving the ACK (802, YES in step S902), the RX 200 determines that the TX 100 is a legacy TX that is not compliant with WPT authentication (step S908). This is because since the RX 200 is compliant with WPT authentication, the RX 200 should receive not an ACK but an ACK (auth) in a case in which the TX 100 is compliant with WPT authentication. Note that if the RX 200 does not receive an ACK in 15 ms after the transmission of the Configuration Packet (NO in step S902) and does not receive the ACK (auth) either (NO in step S903), the process advances to step S909. In this case, the RX 200 determines that the TX 100 is BPP and is not compliant with the negotiation function (step S909), and transitions to the PT phase (step S910).

The RX 200 performs a negotiation of the GP in the negotiation phase, but determines to avoid power reception at 15 W to avoid excessive heating or the like, as described with reference to FIG. 6. For this reason, the RX 200 determines to perform a negotiation for 5 W corresponding to WPT authentication noncompliant (row 603) and USB authentication success (column 602) as the GP, and transmits a Specific Request (5 W) (809). The RX 200 receives an ACK from the TX 100 (810), and ends the negotiation phase. Then, the RX 200 transitions the calibration phase (step S907), executes predetermined processing, and then transitions to the PT phase (step S910).

As described above, the RX 200 compliant with the WPC standard version A can operate even for the TX 100 compliant with the WPC standard before the version A without inconsistency. In addition, as described with reference to FIG. 8E, the RX 200 can operate without inconsistency even in a case in which the TX 100 is compliant with WPT authentication.

[Another Process in Case in which TX is Legacy and RX is Version A]

In the above description, the RX 200 compliant with the version A determines, based on the response from the TX 100 to the Configuration Packet, whether the TX 100 is compliant with WPT authentication or the negotiation function. That is, a case in which the RX 200 makes the above-described determination based on which one of an ACK and an ACK (auth) is received in 15 ms from the transmission of the Configuration Packet or whether the RX 200 does not receive either has been described. Another example of determining whether the TX 100 is compliant with the version A will be described here with reference to FIGS. 8D and 9C. Note that in the following explanation, USB authentication by the TX 100 for the USB cable 300 and the AC adapter 301 is assumed to succeed.

Upon receiving an ACK to the Configuration Packet (YES in step S902), the RX 200 transmits an Auth Req to request execution of WPT authentication (step S913, 810). The Auth Req is a packet that requests the TX 100 to transition to the authentication phase and start the WPT authentication processing 410, and is, for example, a Reserved Packet whose packet type is not defined by the WPC standard v1.2.2. In this embodiment, of the Reserved packet, a packet whose packet header is 0x40 is defined as the Auth Req packet. The TX compliant with the version A returns an ACK to the Configuration Packet, and then transitions to the authentication phase in accordance with reception of the Auth Req packet to start WPT authentication.

On the other hand, the TX that is not compliant with the version A operates as follows. The WPC standard v1.2.2 defines that in the negotiation phase, the TX 100 transmits a Not-Defined Response (ND Resp) packet in accordance with reception of a Packet of a packet type with which the TX 100 is noncompliant. Note that in the I & C phase, the TX 100 is defined not to respond at all even if a compliant Packet is received. The TX 100 transitions to the negotiation phase because it transmits an ACK to the Configuration Packet in 802. Hence, the legacy TX 100 transmits an ND Resp to the RX 200 in response to the Auth Req packet (811). Upon receiving the ND Resp (YES in step S914), the RX 200 determines that the TX 100 is not compliant with WPT authentication (step S908) and transitions to the negotiation phase without performing WPT authentication (step S906).

Here, if the RX 200 receives not the ND Resp to the transmitted Auth Req (NO in step S913) but the ACK (YES in step S914), the process advances to step S904. In this case, the RX 200 determines that the TX 100 is compliant with WPT authentication (step S904) and transitions to the authentication phase (step S905). Note that if the RX 200 receives neither the ND Resp nor the ACK (NO in step S914), the RX 200 requests the TX 100 to stop power transmission (step S916) and returns to the selection phase. The request of the stop of power transmission is done by, for example, transmitting an End of Transmission Packet (ETP). If the WPC sequence cannot be continued due to, for example, a fault in the TX 100 or the degradation of the quality of communication between the TX 100 and the RX 200, the TX 100 is requested to stop power transmission, thereby returning the system to the original state.

In addition, if the RX 200 receives neither the ND Resp nor the ACK, the Auth Req may be resent. This is because there is a possibility that the TX 100 cannot correctly receive the Auth Req. The WPC standard v1.2.2 defines that if a packet cannot correctly be received in the negotiation phase, the TX 100 remains in the negotiation phase. For this reason, the RX 200 may resend the Auth Req and wait until the TX 100 correctly receives the packet. If the TX 100 can correctly receive the packet, the RX 200 can receive the ACK or Auth Req and continue the sequence. Note that the RX 200 may transmit the EPT in a case in which it receives neither the ND Resp nor the ACK even if the Auth Req is continuously transmitted several times (for example, three times).

As described above, at the time of the negotiation phase in a state in which the TX 100 returns a response (ND Resp) to a noncompliant packet, the RX 200 transmits a packet to know whether the TX 100 is compliant with WPT authentication. This allows the RX 200 to determine, based on the response to the Auth Req, whether the TX 100 is compliant with WPT authentication and operate even for the TX 100 that is not compliant with WPT authentication without inconsistency.

In addition, the Auth Req may be replaced with another packet for which a response from the legacy TX 100 can be expected. For example, of packets for which a response can be expected in the WPC standard v1.2.2, a Reserved Packet whose Packet type is undefined or a Proprietary Packet whose Packet type can uniquely be defined can be used. The packets for which a response can be expected include for example, a General Request Packet, and a Specific Request Packet. For example, a Specific Request Packet whose Request field is Reserved (0x05 to 0xEF) may be used. In this case, if the TX 100 is not compliant with WPT authentication, it transmits an ND Resp, and the RX 200 receives this. Alternatively, a General Request Packet whose Request field is Reserved may be used. In this case, if the TX 100 is not compliant with WPT authentication, it transmits a Power Transmitter Data Not Available Packet representing that the TX cannot responds to the Request, and the RX 200 receives this.

In addition, before the Auth Req is transmitted, a packet to know whether the TX is compliant with WPT authentication may be transmitted/received. For example, the RX 200 can request a Power Transmitter Identification Packet storing the individual identification information or standard version of the TX 100 by a General Request Packet. In this case, before the Auth Req, the RX 200 obtains the standard version of the TX 100 by the General Request Packet. If the obtained version is the version A or a later version, the RX 200 can determine that the TX 100 is compliant with WPT authentication and transmit the Auth Req. On the other hand, if the obtained version is a version before the version A, the RX 200 can determine that the TX 100 is not compliant with WPT authentication.

In addition, the RX 200 may transmit a Power Transmitter Capability Packet storing the capability information of the TX 100 in place of the Power Transmitter Identification Packet. This request can be done by a General Request Packet. The Power Transmitter Capability Packet is a packet used to by the TX 100 to notify the power transmission capability, and can include information representing that the TX can execute WPT authentication. In this case, a bit 1010 or 1011 that is Reserved in the Power Transmitter Capability Packet (FIG. 10B) of the WPC standard v1.2.2 is defined as an Auth bit by the version A. If the TX is compliant with WPT authentication, "1" is written in the Auth bit. If the TX is not compliant with WPT authentication, "0" is written. The TX 100 compliant with the version A writes "1" in the Auth bit of the Power Transmitter Capability Packet. Note that since a legacy TX is not compliant with the Auth bit, this bit is handled as Reserved, and "0" is stored.

In this processing example, to receive a response to the Reserved Packet, the RX 200 transmits the Reserved Packet during the stay of the TX 100 in the negotiation phase. According to this, depending on whether the response is the ND Resp or the ACK, the RX 200 can determine whether the TX 100 is legacy or is compliant with WPT authentication. Note that since a legacy TX is defined by the WPC standard v1.2.2 not to respond even if such a packet is received during the stay in the I & C phase, the above-described determination cannot be performed.

[Still Another Process in Case in which TX is Legacy and RX is Version A]

An example in which the RX 200 determines, based on a response to an ACK (auth) or Auth Req, whether the TX 100 is compliant with WPT authentication has been described. Another example will be described below with reference to FIG. 9B. Note that in the following explanation, USB authentication by the TX 100 for the USB cable 300 and the AC adapter 301 is assumed to succeed.

The operation of the TX 100 compliant with WPT authentication will be described before the explanation. Upon determining, by the Configuration Packet, that the RX 200 is compliant with WPT authentication, the TX 100 transitions to the authentication phase. Then, the TX 100 receives the start of a GET_DIGEST packet from the RX 200 in a predetermined time from the trailing end of an ACK to the Configuration Packet. Here, in this embodiment, of the Specific Requests according to the WPC standard v1.2.2, one of packets with header numbers in which the Packet type is not defined is defined as the GET_DIGEST packet.

The RX 200 transmits the GET_DIGEST after the I & C phase (step S911). After that, if the TX 100 is legacy, the RX 200 receives an ND Resp (YES in step S912). Hence, the RX 200 determines that the TX 100 is not compliant with WPT authentication (step S908), and transitions to the negotiation phase. In this way, the RX 200 operates for the legacy TX 100 without inconsistency. If the TX 100 is compliant with WPT authentication, the RX 200 does not receive the ND Resp (NO in step S912) but receives a DIGEST message. Hence, the RX 200 determines that the TX 100 is compliant with WPT authentication (step S904), and transitions to the authentication phase (step S905).

In the above description, the GET_DIGEST packet is defined as one of the Specific Requests. However the GET_DIGEST packet may be defined as one of the General Requests. For example, of the General Requests, one of packets with header numbers in which the Packet type is not defined can be defined as the GET_DIGEST packet. If the TX 100 is legacy, the RX 200 transmits the GET_DIGEST (step S911), and then receives a Power Transmitter Data Not Available Packet (YES in step S912).

In addition, as for the GET_DIGEST packet, of the packets of the WPC standard v1.2.2, a packet other than the Specific Requests or General Requests may be used as the GET_DIGEST packet. For example, the GET_DIGEST packet is defined as one of the Reserved Packets or Proprietary Packets whose Packet type is undefined, unlike the Specific Request or General Request. If the TX 100 is legacy, the RX 200 transmits the GET_DIGEST (step S911), and then receives a ND Resp (YES in step S912).

As described above, the RX 200 according to this embodiment can operate without inconsistency when the TX 100 is legacy and when the TX 100 is compliant with WPT authentication.

Additionally, upon receiving a packet other than predetermined packets from the RX 200 in the authentication phase, the TX 100 may stop power transmission of the power transmission unit 103 and transition to the selection phase. Here, the predetermined packets are the packets 814 to 820 which are the GET_DIGEST, DIGEST, GET-CERTICARTE, CERTIFICATE, CHALLENGE, RESPONSE, and RESULT. When a Signal Strength Packet, a Control Error Packet, an ID Packet, a Configuration Packet, or the like is received in the authentication phase, the TX 100 stops power transmission. Here, the Signal Strength Packet is a packet representing the voltage value of a received voltage, and the Control Error Packet and the ID Packet are packets that request an increase/decrease of the voltage value. Then, the TX 100 returns to the selection phase. In this way, upon receiving a packet other than the predetermined packets in the authentication phase due to a fault in the RX 200 or the like, the TX 100 stops power transmission to prevent the system from performing an unexpected operation.

As described above, in the contactless charge system according to this embodiment, device authentication using the USB protocol is performed between the power transmission apparatus and the power supply apparatus (AC adapter 301) that is the power supply source, and device authentication using the WPC protocol is performed between the power transmission apparatus and the power receiving apparatus. Then, the power transmission apparatus of WPC controls the transmission power based on the device authentication result of USB and the device authentication result of WPC. Accordingly, in wireless power transmission capable of executing a plurality of types of device authentication protocols, the authentication results can effectively be used. As a result, for example, appropriate power transmission control without causing a problem such as excessive heating in a device existing in the path of power supply can be implemented.

In addition, before the power transmission apparatus of WPC starts power transmission to the power receiving apparatus, the transmission power of the power transmission apparatus of WPC is limited based on the authentication result of USB. Accordingly, after the start of power transmission by WPC, renegotiation of the transmission power by the limitation of the transmission power based on the result of USB authentication does not occur, and high-speed control can be implemented.

Other Embodiments

The power transmission method of the wireless power transmission system according to this embodiment is not particularly limited. For example, a magnetic field resonance method of transmitting a power using coupling caused by the resonance of a magnetic field between the resonator (resonance element) of the TX and the resonator (resonance element) of the RX can be used. Alternatively, a power transmission method using an electromagnetic induction method, an electric field resonance method, a microwave method, a laser, or the like may be used.

In addition, the TX and the RX may each be, for example, an image input apparatus such as an image capturing apparatus (a camera or a video camera) or a scanner, or an image output apparatus such as a printer, a copying machine, or a projector. Furthermore, the TX and the RX may each be a storage device such as a hard disk drive or a memory device, or an information processing apparatus such as a personal computer (PC) or a smartphone.

In addition, the flowcharts shown in FIGS. 5, 7, 9A to 9C, and 11 are started when, for example, the control unit 101 or the control unit 201 is powered on. For example, the processes shown in FIGS. 5 and 7 can be implemented by executing a program stored in the memory 107 of the TX 100 by the control unit 101. In addition, the flowcharts shown in FIGS. 9A to 9C and 11 can be implemented by executing a program stored in the memory 209 of the RX 200 by the control unit 201. Note that at least some of the processes shown in the flowcharts of FIGS. 5, 7, 9A to 9C, and 11 may be implemented by hardware. For example, the processing can be implemented by a dedicated circuit automatically generated on an FPGA from a program configured to implement each step using a predetermined compiler. Alternatively, the processing may be implemented by hardware by forming a Gate Array circuit, like the FPGA.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-074045, filed Apr. 6, 2018 which is hereby incorporated by reference herein in its entirety.

What is claimed is:

1. A power receiving apparatus comprising:
a receiving unit configured to wirelessly receive a power from a power transmission apparatus that uses a power supplied from a power supply apparatus;
an obtaining unit configured to obtain, from the power transmission apparatus, a result of first authentication between the power supply apparatus and the power transmission apparatus;
an authentication unit configured to perform second authentication for the power transmission apparatus;
a determination unit configured to determine, based on the result of the first authentication obtained by the obtaining unit and the second authentication performed by the authentication unit, a power value to be requested to the power transmission apparatus in performing a negotiation; and
a negotiation unit configured to perform a negotiation concerning a power transmitted to the power receiving apparatus with the power transmission apparatus based on requesting the power value determined by the determination by the determination unit.

2. The power receiving apparatus according to claim 1, further comprising a first confirmation unit configured to confirm that the power transmission apparatus is compliant with the first authentication.

3. The power receiving apparatus according to claim 2, wherein the first confirmation unit performs the confirmation based on a first predetermined packet received from the power transmission apparatus.

4. The power receiving apparatus according to claim 3, wherein the first predetermined packet is a Power Transmitter Capability Packet of a WPC (Wireless Power Consortium) standard.

5. The power receiving apparatus according to claim 3, wherein the authentication unit starts the second authentication after the first predetermined packet is received.

6. The power receiving apparatus according to claim 1, further comprising a second confirmation unit configured to confirm that the power transmission apparatus is compliant with the second authentication.

7. The power receiving apparatus according to claim 6, wherein the second confirmation unit confirms, based on a response obtained when a second predetermined packet is transmitted to the power transmission apparatus, that the power transmission apparatus is compliant with the second authentication.

8. The power receiving apparatus according to claim 7, wherein the second predetermined packet is a Configuration Packet of a WPC (Wireless Power Consortium) standard.

9. The power receiving apparatus according to claim 1, wherein the authentication unit performs the second authentication in a case in which a packet received from the power transmission apparatus and configured to notify a capability of the power transmission apparatus includes information representing that the power transmission apparatus has a capability of performing the second authentication.

10. The power receiving apparatus according to claim 1, wherein in a case in which the first authentication does not succeed, the negotiation unit requests a small power value as compared to a case in which the first authentication succeeds.

11. The power receiving apparatus according to claim 1, wherein in a case in which both the first authentication and the second authentication succeed, the negotiation unit performs the negotiation based on a maximum value of one of a power transmission capability of the power transmission apparatus and a power receiving capability of the power receiving apparatus.

12. The power receiving apparatus according to claim 1, wherein in a case in which a device of an authentication target is not compliant with the first authentication and/or the second authentication, a transmission power requested of the power transmission apparatus by the negotiation unit is small as compared to a case in which the first authentication and the second authentication succeed.

13. The power receiving apparatus according to claim 1, wherein
the obtaining unit further obtains information representing that the first authentication has ended, and
the negotiation unit performs the negotiation in a case in which it is determined, based on the information obtained by the obtaining unit, that the first authentication has ended.

14. The power receiving apparatus according to claim 1, further comprising a transmission unit configured to transmit the result of the second authentication to the power transmission apparatus.

15. The power receiving apparatus according to claim 1, further comprising a notification unit configured to notify a result of the negotiation by the negotiation unit, and/or the result of the first authentication, and/or the result of the second authentication.

16. The power receiving apparatus according to claim 1, wherein the negotiation unit performs the negotiation so that the transmission power to the power receiving apparatus does not exceed the determined power value.

17. The power receiving apparatus according to claim 1, wherein
the power supply apparatus supplies the power via a cable, and
in the first authentication, authentication is performed for the power supply apparatus and the cable.

18. The power receiving apparatus according to claim 1, wherein
the first authentication is performed using a first communication protocol, and
the authentication unit performs the second authentication for the power transmission apparatus using a second communication protocol using a medium different from that of the first communication protocol.

19. The power receiving apparatus according to claim 1, wherein the power value is a power value guaranteed for an output to a load of the power receiving apparatus.

20. A method of controlling a power receiving apparatus, comprising:
obtaining, from a power transmission apparatus that uses a power supplied from a power supply apparatus, a result of first authentication between the power supply apparatus and the power transmission apparatus;
performing second authentication for the power transmission apparatus;
determining, based on the obtained result of the first authentication and the performed second authentication, a power value to be requested to the power transmission apparatus in performing a negotiation;

performing a negotiation concerning a power transmitted to the power receiving apparatus with the power transmission apparatus based on requesting the determined power value; and wirelessly receiving a power from the power transmission apparatus.

21. A non-transitory computer-readable storage medium storing a computer program configured to cause a computer provided in a power receiving apparatus to:

obtain, from a power transmission apparatus that uses a power supplied from a power supply apparatus, a result of first authentication between the power supply apparatus and the power transmission apparatus;

perform second authentication for the power transmission apparatus;

determine, based on the obtained result of the first authentication and the performed second authentication, a power value to be requested to the power transmission apparatus in performing a negotiation;

perform a negotiation concerning a power transmitted to the power receiving apparatus with the power transmission apparatus based on requesting the determined power value; and wirelessly receive a power from the power transmission apparatus.

* * * * *